US008751613B1

(12) United States Patent
Medved et al.

(10) Patent No.: US 8,751,613 B1
(45) Date of Patent: Jun. 10, 2014

(54) APPLICATION LAYER TRAFFIC OPTIMIZATION ENHANCEMENTS FOR MOBILE DEVICES

(75) Inventors: Jan Medved, Pleasanton, CA (US); David Ward, Los Gatos, CA (US); James Guichard, New Boston, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 446 days.

(21) Appl. No.: 12/942,678

(22) Filed: Nov. 9, 2010

Related U.S. Application Data

(60) Provisional application No. 61/349,467, filed on May 28, 2010.

(51) Int. Cl.
*G06F 15/177* (2006.01)

(52) U.S. Cl.
USPC .......................................... 709/220; 370/229

(58) Field of Classification Search
None
See application file for complete search history.

(56) References Cited

U.S. PATENT DOCUMENTS

| | | | |
|---|---|---|---|
| 7,716,662 B2 | 5/2010 | Seiden | |
| 7,978,708 B2 | 7/2011 | Filsfils et al. | |
| 8,179,801 B2 | 5/2012 | Previdi et al. | |
| 2002/0062310 A1* | 5/2002 | Marmor et al. | 707/3 |
| 2002/0128768 A1 | 9/2002 | Nakano et al. | |
| 2003/0179742 A1* | 9/2003 | Ogier et al. | 370/351 |
| 2005/0170845 A1* | 8/2005 | Moran | 455/456.1 |
| 2007/0064702 A1 | 3/2007 | Bates et al. | |
| 2009/0122718 A1 | 5/2009 | Klessig et al. | |
| 2010/0161755 A1* | 6/2010 | Li et al. | 709/217 |
| 2010/0293294 A1 | 11/2010 | Hilt et al. | |
| 2011/0078230 A1 | 3/2011 | Sepulveda | |
| 2011/0202651 A1 | 8/2011 | Hilt et al. | |
| 2011/0276718 A1 | 11/2011 | Steiner et al. | |
| 2012/0066368 A1 | 3/2012 | Li et al. | |
| 2012/0317293 A1 | 12/2012 | Gu et al. | |

FOREIGN PATENT DOCUMENTS

WO WO/2011/054913 * 5/2011

OTHER PUBLICATIONS

Seedorf et al., Traffic Localization for P2P-Applications: The ALTO Approach, Sep. 9-11, 2009, p. 171-177.*
Sheng et al., Application Layer Traffic Optimization in the eMule System, May 9-15, 2010, p. 217-222.*
Ye et al., A Scheme to Solve P2P ALTO Problem.*
Alimi et al., ALTO Protocol Draft, Mar. 8, 2010, p. 1-52.*

(Continued)

*Primary Examiner* — Ario Etienne
*Assistant Examiner* — Clayton R Williams
(74) *Attorney, Agent, or Firm* — Shumaker & Sieffert, P.A.

(57) ABSTRACT

In general, techniques are described for enhancing the Application-Layer Traffic Optimization (ALTO) service to supplement network topological grouping with location-based groupings to account for endpoint mobility. For example, as described herein, an ALTO server maintains physical location information for a network of one or more endpoints that provides a service. A PID generator of the ALTO server aggregates the endpoints into a set of one or more PIDs based at least on the physical location information for the endpoints, wherein each PID is associated with a subset of the endpoints. The ALTO server generates network and cost maps for the ALTO service that include PID entries to identify a respective subset of the endpoints associated with each of the set of PIDs and cost entries that incorporate cost that reflect physical distances among endpoints.

21 Claims, 10 Drawing Sheets

(56) References Cited

OTHER PUBLICATIONS

Alimi et al., "ALTO Protocol," draft-ietf-alto-protocol-03.txt, ALTO WG Internet-Draft, Mar. 8, 2010, 53 pp.
Alimi et al., "ALTO Protocol," draft-ietf-alto-protocol-06.txt, ALTO WG Internet-Draft, Oct. 25, 2010, 66 pp.
Penno et al., "ALTO Protocol," draft-penno-alto-protocol-00.txt, ALTO WG, Internet-Draft, Mar. 4, 2009, 22 pp.
Penno et al., "ALTO and Content Delivery Networks," draft-penno-alto-cdn-00, Jun. 4, 2010, 19 pp.
Seedorf et al., "Application-Layer Traffic Optimization (ALTO) Problem Statement," RFC 5693, Network Working Group, Oct. 2009, 15 pp.
Zimmerman, "OSI Reference Model—The ISO Model of Architecture for Open Systems Interconnection," IEEE Transaction on Communications, vol. 28, No. 4, Apr. 1980, pp. 425-432.
U.S. Appl. No. 12/235,677, by Anjan Venkatramani, filed Sep. 23, 2008.
U.S. Appl. No. 12/861,645, by Jan Medved, filed Aug. 23, 2010.
U.S. Appl. No. 12/861,671, by Jan Medved, filed Aug. 23, 2010.
U.S. Appl. No. 12/861,681, by Satish Raghunath, filed Aug. 23, 2010.

* cited by examiner

|  | Endpoints |
|---|---|
| PID-0 | [80A, 80B, 80C] |
| PID-1 | [80D] |
| PID-20 | [86A] |
| PID-21 | [86B] |

|  | Endpoints |
|---|---|
| PID-0 | [80A, 80B] |
| PID-1 | [80C, 80D] |
| PID-20 | [86A] |
| PID-21 | [86B] |

| PID | PID | Cost |
|---|---|---|
| PID-0 | PID-20 | 13 |
| PID-0 | PID-21 | 14 |
| PID-1 | PID-20 | 14 |
| PID-1 | PID-21 | 12 |

APPLICATION LAYER TRAFFIC OPTIMIZATION ENHANCEMENTS FOR MOBILE DEVICES

PRIORITY CLAIM

This application claims the benefit of U.S. Provisional Application No. 61/349,467, filed May 28, 2010, the entire content of which is incorporated herein by reference.

TECHNICAL FIELD

The invention relates to computer networks and, more specifically, to improving content delivery to mobile devices.

BACKGROUND

Peer-to-peer (P2P) applications exchange large amounts of data and generate significant amounts of network traffic. P2P applications leverage multiple copies of data content populated to multiple different network nodes to allow a requesting agent to obtain portions of the data content from one or more of many possible data sources. Such P2P distributed applications improve application performance and scalability and are frequently used for file sharing, real-time communication, and on-demand media streaming.

Many P2P applications operate by implementing an application layer overlay network over the communication network. The overlay network is a logical network of participating network nodes (peers) directly interconnected via overlay links that are each abstractions of one or underlying transport links of the communication network. The overlay network include data structures that index one or more network devices (or "resources") that store and source specific data content, such as files or file portions. A peer seeking particular data content queries the data structures to obtain a list of identities of network devices that source the file. The peer (here operating as a client) randomly selects one of the devices from the list from which to request and receive the data content via the overlay network.

Client software for P2P applications often select resources naively, that is, without incorporating network topology information or related details. Rather, clients rely on heuristics to approximate such information. As a result, network data traffic exchanged using these applications may congest network links, cross service provider network boundaries multiple times, and generally transit the communication network in a manner that is suboptimal from a user-standpoint and undesirable from the point of view of the service provider. For instance, while two peers may be members of the same service provider network, an overlay link connecting the peers may nevertheless traverse multiple network boundaries, which unnecessarily increases the inter-peer transit costs to the service provider. Furthermore, although distributed applications capitalize on excess bandwidth at the data sources to improve throughput and reduce latencies for end-users while also reducing the burden of content providers to provision application servers, the ability to cheaply distribute data content comes at the expense of service providers, which bear the cost of inefficiently transporting network data.

Recently, an Application-Layer Traffic Optimization (ALTO) service has been proposed in which an ALTO protocol is used to provide guidance to P2P applications regarding selection of a resource from which to obtain data content. In one example, a service provider provisions an ALTO server for a service provider network with network topology and topology link cost information. P2P clients send ALTO requests to the ALTO server to obtain a network map and a corresponding cost map. The network map specifies a subset of network topological groupings defined by the ALTO server for the network. A cost map for the network map defines provider preferences respecting inter-group routing costs for connections among the various groups of the network map. As a result, service providers provisioning the ALTO server may direct P2P clients to select resources according to service provider preferences, which may include optimizing throughput and/or user experience, for instance, reducing costs to the service provider, or promoting other provider objectives. The ALTO service and ALTO protocol is described in further detail in J. Seedorf et al., RFC 5693, "Application-Layer Traffic Optimization (ALTO) Problem Statement," Network Working Group, the Internet Engineering Task Force draft, October 2009; and R. Alimi et al., "ALTO Protocol: draft-ietf-alto-protocol-06.txt," ALTO Working Group, the Internet Engineering Task Force draft, October 2010, each of which is incorporated herein by reference in its entirety.

SUMMARY

In general, techniques for enhancing the ALTO service to supplement network topological grouping with location-based groupings to account for device mobility are described. Roaming mobile devices frustrate simple topological-based routing by attaching to mobile service provider network gateways that may not necessarily serve the permanent network addresses of the roaming devices. That is, such gateways may not advertise themselves as a next hop for routing destinations that encompass the network addresses of various roaming devices attached to the gateways. Techniques such as Mobile Internet Protocol (IP) enable location-independent routing of network-layer packets by, for instance, assigning a temporary routable network address to a roaming device and routing packets to the roaming device on the basis of the temporary address.

The conventional ALTO service, as an application-layer, endpoint-based service that groups network devices by their respective network addresses in accordance with a network topology, does not incorporate NAT and other information used by a mobile service provider network to enable continued end-to-end routing. As a result, roaming mobile devices similarly frustrate a goal of the ALTO service, i.e., to provide reliable information regarding the topology of the underlying network to endpoint applications to improve peer/server selection. An ALTO service may thus cause a mobile device application to select a peer/server that, while "optimal" with respect to a network-topological location of the mobile device, may in fact be sub-optimal when the mobile device is roaming and has consequently decoupled its physical location from its network-topological location. As another example, an ALTO service may aggregate geographically distributed servers that are nevertheless members of, for instance, the same subnet. In such instances, the ALTO service may fail to distinguish geographically distributed servers that, due to dissimilar distances, provide dissimilar service performance for a particular client.

In one example, techniques are described in which an ALTO service for a network receives geographical location information from mobile devices. The ALTO server generates a network map for a network by incorporating the received geographical location information to affect the grouping of mobile devices within network maps. Specifically, the ALTO server generates a network map by organizing groups (or "PIDs") of mobile devices according to the geographical proximity of the mobile devices to one another in addition to, or instead of, network topology-based grouping. In other words, the ALTO server assigns mobile devices to a network map PID based not only on the network addresses of the mobile devices, but based also on the physical locations of the mobile devices. The ALTO server may generate a cost map for the network map that includes inter-PID path costs calculated using the geographic distances between PIDs of the network map.

In one embodiment, the invention is directed to a method comprising aggregating, with an application-layer traffic optimization (ALTO) server that stores physical location information for a network of one or more endpoints that provides a service, the endpoints into a set of one or more PIDs based at least on the physical location information, wherein each PID is associated with a subset of the endpoints. The method further comprises generating a first ALTO network map that includes PID entries to identify a respective subset of the endpoints associated with each of the set of PIDs.

In another embodiment, the invention is directed to an application-layer traffic optimization (ALTO) server comprising an endpoint locations module to store physical location information for a network of one or more endpoints that provides a service. The ALTO server further comprises a PID generator to aggregate the endpoints into a set of one or more PIDs based at least on the physical location information, wherein each PID is associated with a subset of the endpoints. The ALTO server further comprises a network map module to generate a first ALTO network map that includes PID entries to identify a respective subset of the endpoints associated with each of the set of PIDs.

In another embodiment, the invention is directed to a non-transitory computer-readable medium containing instructions. The instructions cause a programmable processor to aggregate, with an application-layer traffic optimization (ALTO) server that stores physical location information for a network of one or more endpoints that provides a service, the endpoints into a set of one or more PIDs based at least on the physical location information, wherein each PID is associated with a subset of the endpoints. The instructions further cause a programmable processor to generate a first ALTO network map that includes PID entries to identify a respective subset of the endpoints associated with each of the set of PIDs.

The described techniques may provide one or more advantages. For example, incorporating location information into an ALTO service may enable an ALTO client to select a serving node for an application that reduces a distance between the serving node and a mobile device that is requesting the application content. Because distance between a network source and network destination strongly correlates to transport latency, reducing such distance using the location-based selection techniques herein described may reduce the transport latency of content delivery from the source to the destination. In addition, in a content delivery network (CDN), accounting for physical locations of mobile devices when selecting a serving CDN cache for a requesting mobile device may reduce peering and transport costs. As a still further example, the techniques may enable a client peer of a P2P network to select a serving peer of the network that does not share a cell with the client peer rather than a shared cell. The peers may therefore split the required radio bandwidth for a P2P transaction between two different cells. The techniques may thus extend the benefits of the ALTO service to the mobile arena.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 5A-5B illustrate a representation of an exemplary ALTO network map for a network system prior to and subsequent to reorganization due to device mobility.

FIG. 6 illustrates an exemplary ALTO cost map.

DETAILED DESCRIPTION

Figure 1:
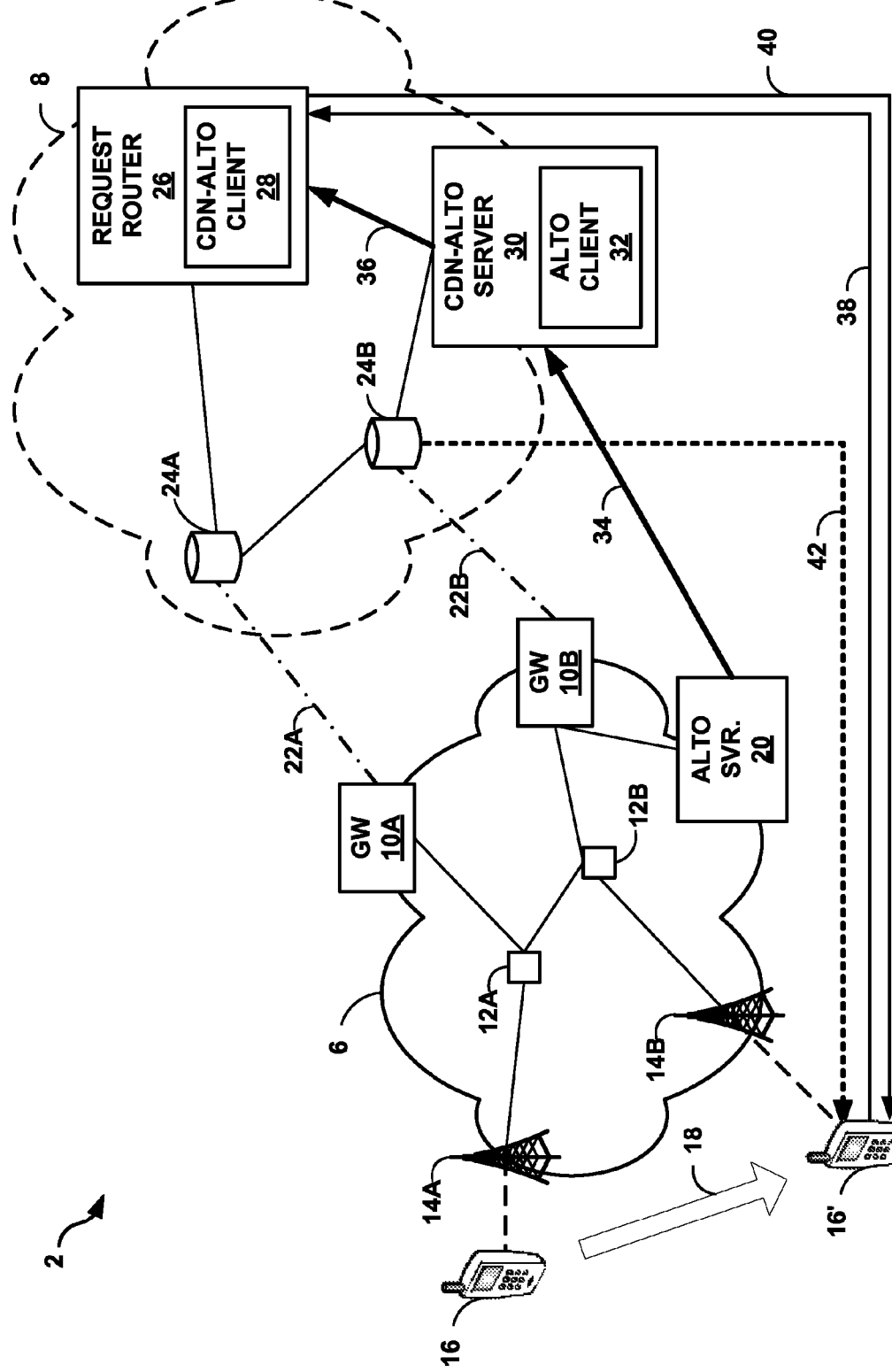
FIG. 1 is a block diagram illustrating an exemplary network system in which one or more network devices perform the techniques described in this disclosure to extend an Application-Layer Traffic Optimization (ALTO) service to roaming mobile devices.

FIG. 1 is a block diagram illustrating an exemplary network system 2 in which one or more network devices perform the techniques described in this disclosure to extend an Application-Layer Traffic Optimization service to roaming mobile devices. As shown in FIG. 1, exemplary network system 2 includes both content delivery network 8 ("CDN 8") and cellular network 6. Cellular network 6 may represent a public network that is owned and operated by a service provider to provide network access to CDN 8 to one or more wireless subscriber devices, including mobile device 16. As a result, cellular network 6 may be alternately referred to herein as a mobile service provider (SP) network.

Cellular network 6 includes gateway devices 10A-10B ("gateway devices 10"), serving nodes 12A-12B ("serving nodes 12"), base stations 14A-14B ("base stations 14"), and a mobile device 16. While shown for ease of illustration purposes as including only two gateway devices 10, two serving devices 12, and one mobile device 16, cellular network 6 may comprise a plurality of gateway devices and a plurality of serving devices that service a plurality of mobile devices.

In general, cellular network 6 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GGP/2), an Internet Engineering Task Force (IETF) and a Worldwide Interoperability for Microwave Access (WiMAX) forum.

For example, cellular network 6 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Cellular network 6 may, alternatively or in conjunction with one of the above, implement a code division multiple access-2000 ("CDMA2000") architecture. Cellular network 6 may, again as an alternative or in conjunction with one or more of the above, implement a WiMAX architecture defined by the WiMAX forum.

Cellular network 6 may consist of a core packet-switched network that includes gateway devices 10 and serving devices 12 coupled to one or more radio access networks (RANs) that each include one or more of base stations 14 as well as other RAN components such as Radio Network Controllers (RNCs) (not shown). The core network and RANs that constitute cellular network 6 may communicate over a backhaul network that includes land-based transmission lines, frequently leased by a service provider of cellular network 6, to transport mobile data and control traffic between radio access network base stations and the core networks. The backhaul network also includes network devices such as aggregation devices and routers. Cellular network 6 executes various protocols to exchange data and control information among gateway devices 10, serving devices 12 and base stations 14 over a number of wired and/or wireless links that interconnect these devices. Base stations 14 communicatively couple to mobile device 16 over a wireless link.

Depending on the standard, cellular network 6 facilitates access to CDN 8 by implementing a mobile data protocol. For example, within the GSM architecture, cellular network 6 may implement a general packet radio service (GPRS) protocol, such as a GPRS tunneling protocol (GTP), to facilitate access to CDN 8. In this exemplary instance, gateway devices 10 may each represent a gateway GPRS support node (GGSN), serving devices 12 may each represent a serving GPRS support node (SGSN), and base stations 14 may each represent a Node B.

As another example, cellular network 6 may implement CDMA2000. Gateway devices 10 and serving devices 12 may each, in this example, represent a packet data servicing node (PDSN) that is responsible for managing sessions between cellular network 6 and mobile devices attached to cellular network 6, such as mobile device 16. As still further examples, cellular network 6 may implement an LTE mobile data protocol. Gateway devices 10 and serving devices 12 may represent, in this example, packet data network (PDN) gateways and serving gateways, respectively.

While described herein with respect to one or more particular architectures for ease of illustration purposes, cellular network 6 may implement any architecture both those set forth by any standards body and those proprietarily owned. Moreover, the techniques may apply to any mobile data protocol supported by these architectures. The techniques therefore should not be limited to cellular architecture referenced herein and the mobile data protocols supported by these architectures. Gateway devices 10 and serving devices 12 may, therefore, each represent an abstraction of devices found within any one of the above cellular network architectures. Some embodiments of network system 2 may include multiple cellular networks 6 that provide network access to mobile device 16 when attached to a respective such cellular network.

Cellular network 6 couples to CDN 8, a network of interconnected devices that cooperate to distribute content to clients using one or more services. Such content may include, for instance, streaming media files, data files, software, domain name system information, documents, database query results, among others. Accordingly, examples of services offered by CDN 8 may include hyper-text transfer protocol (HTTP), HTTP-based adaptive streaming, Real-Time Streaming Protocol (RTSP) streaming, other media streaming, advertising, file transfer protocol (FTP), and others. CDN 8 comprises CDN cache nodes 24A-24B ("CDN nodes 24") that store replicated content and serve that content to requesting devices using, for example, a transmission control protocol (TCP) or user datagram protocol (UDP) session operating over intermediate devices of CDN 8 (not shown for simplicity) that interconnect CDN nodes 24 and other networks, such as cellular network 6. Each of CDN nodes 24 may include one or more data servers, web servers, application servers, databases, computer clusters, mainframe computers, and any other type of server, computing element, and/or database that may be employed by a content service provider to facilitate the delivery of content from the cache to mobile device 16 via cellular network 6.

A content provider administers CDN nodes 24 to optimize content delivery using load balancing techniques, caching, request routing, and/or content services. CDN nodes 24 may mirror content, though any of CDN nodes 24 may provide different services and data content than that provider by the other CDN nodes. In some embodiments, CDN 8 is also a service provider network or other access network. While application of the techniques is described herein with respect to selecting a serving node of a content delivery network, the techniques are applicable to other network types, such as P2P networks. Accordingly, CDN 8 may in some embodiments represent the Internet or any other packet-based, publicly accessible computer network that transports content sourced by nodes for delivery to mobile device 16.

Respective gateways 10 connect to respective CDN nodes 24 via respective communication links 22A-22B that deliver content from CDN 8 to cellular network 6. The term "communication link," as used herein, comprises any form of transport medium, wired or wireless, and can include intermediate nodes such as network devices. For example, communication links 22 may each comprise a respective autonomous system border/boundary router (not shown) or provider edge router that executes the border gateway protocol (BGP) to advertise, to the other routers (or peers), network destinations to which the router offers connectivity.

Mobile device 16 hosts one or more applications that connect to CDN 8 via cellular network 6 to request and download application related content. Mobile device 16 is a subscriber device and may comprise, for example, a mobile or "smart" phone, Personal Digital Assistants (PDAs), and another type of device cable of connecting to cellular network 6 via a wireless connection to one of base stations 14.

Content delivery network 8 comprises request router 26 to receive content requests from mobile device 16, select and locate one of CDN nodes 24 that is capable of servicing the request, and redirecting the requesting host to the identified CDN node. Request router 26 may be, for example, a DNS or other type of server, a proxying device, a P2P peer, a P2P application-specific tracker, or a firewall or other security device. In some instances, request router 26 implements DNS server load balancing (SLB). In some instances, request router 26 is a content-aware content request router that maps particular content or content-types to each of CDN nodes 24 that store and source the particular content or content-types. In such instances, request router 26 selects one of CDN nodes 24 to service a request according to content or content-type availability. In some instances, request router 26 is a service-aware service request router that maps services to each of CDN nodes 24 that provide the service irrespective of whether the CDN node presently stores content for the service. In such instances, request router 26 selects one of CDN nodes to service a request according to service capabilities. If a selected one of CDN nodes 24 that provides the service does not store the content, the CDN node requests and receives the content from a centralized server (not shown) or from another one of CDN nodes 24.

In some embodiments, request router 26 is an HTTP redirector. That is, request router 26 receives HTTP requests for content from HTTP clients and redirects the request to a selected one of CDN nodes 24 by returning, to the requesting device, an HTTP response having status-code 302 and including a network address of the selected CDN node. In some embodiments, mobile device 16, CDN nodes 24, and request router 26 are P2P peers connected in an overlay network to exchange location information and content using a P2P application. In such P2P embodiments, request router 26 may be a centralized server for the P2P application that indexes content to peers and provides location information in place of a peer.

To influence the selection of a particular CDN node 24 to service a particular request received from a network device, CDN 8 additionally employs an Application-Layer Traffic Optimization (ALTO) service that is provided by CDN-ALTO server 30 of CDN 8. In general, the ALTO service enables CDN 8 to influence the selection process to further content provider objectives, which may include improving user-experience by selecting the most geographically proximate one of CDN nodes 24 to a requesting host 10, reducing transmission costs to the content provider, load balancing, service-level discrimination, accounting for bandwidth constraints, and other objectives. Further details regarding the use of an ALTO service in CDNs may be found in R. Penno et al., "ALTO and Content Delivery Networks: draft-penno-alto-cdn-00," Network Working Group, the Internet Engineering Task Force draft, June 2010, which is incorporated herein by reference in its entirety.

CDN-ALTO server 30 generates and stores a network map and cost map for CDN 8. As described in detail below with respect to FIG. 4, a network map contains network location identifiers, or PIDs, that each represents one or more network devices in a network. In general, a "PID," as the term is used herein, may represent a single device or device component, a collection of devices such as a network subnet, an SP network, or some other grouping. The network map stored by CDN-ALTO server 30 includes PIDs that represent at least CDN nodes 24. As described in detail below with respect to FIG. 6, a cost map contains cost entries for pairs of PIDs represented in the network map and an associated value that represents a cost to traverse a network path between the members of the PID pair. The value can be ordinal (i.e., ranked) or numerical (e.g., actual). CDN-ALTO server 30 may generate the network maps and cost map by obtaining physical locations for CDN nodes 24 of CDN 8 and then applying policies to the physical locations to aggregate the CDN nodes into PIDs and calculate costs, per a specified criteria such as transmission cost or node priority, for traversing a network path between members of PID pairs. In some embodiments, a CDN administrator or a third party provisions CDN-ALTO server 30 with a network map and cost map. CDN-ALTO server 30 may comprise, for example, a high-end server or other service device, a content indexer for a P2P application, or a service card insertable into a network device, such as a router or switch. CDN-ALTO server 30 may operate as an element of a service plane of a router to provide ALTO services in accordance with the techniques of this disclosure.

Cellular network 6 also implements an ALTO service using ALTO server 20, which stores generates and maintains a network map and cost map for cellular network 6. The network map maintained by ALTO server 20 includes PIDs that represent at least mobile device 16 and gateways 10. In some embodiments, ALTO server 20 represents each of gateways 10 in the network map for cellular network 6 with a unique PID that represents no additional network devices. ALTO server 20 may specify a PID-type for PIDs representing gateways 10 and/or a PID-type, e.g., "mobile host," for mobile device 16. Further example details regarding specifying a PID type for PIDs can be found in Medved et al., U.S. patent application Ser. No. 12/861,671, entitled "APPLICATION-LAYER TRAFFIC OPTIMIZATION SERVICE END-POINT TYPE ATTRIBUTE," filed Aug. 23, 2010, the entire contents of which are incorporated herein by reference.

In accordance with the techniques of this disclosure, ALTO server 20 generates network and cost maps for cellular network 6 based at least on a physical location of mobile device 16. That is, ALTO server 20 generates the ALTO service maps according to a physical location of mobile device 16 as known to ALTO server 20 at the time of generation. Initially, mobile device 16 attaches to cellular network 6 at base station 14A. Mobile device 16 sends information regarding its physical location to ALTO server 20 in a location update message. Such information may comprise longitude/latitude coordinates for mobile device 16, an identifier for base station 14A, an identifier for serving node 12A that serves base station 14A, or other location-correlated information. Location information may also include cell bandwidth utilization that may affect transport performance from/to mobile device 16. Upon receiving the location update message, ALTO server 20 aggregates mobile device 16 and any other devices (not shown) that are proximate to mobile device 16 into a PID of a network map for cellular network 6. As specified in the cost map for cellular network 6, this PID may have a lower cost to a PID that includes gateway 10A than to a PID that includes gateway 10B.

Mobile device 16 then attaches to cellular network 6 at base station 14B after movement 18 to a location signified in FIG. 1 as mobile device 16'. Mobile device 16' as illustrated is thus a representation of mobile device 16 moved to a different location. Mobile device 16 sends, directly or indirectly, ALTO server 20 another location update message to cause ALTO server 20 to aggregate mobile device 16 into a different PID of the network map for cellular network 6 based at least on the new physical location of mobile device 16 after movement 18. As specified in the cost map for cellular network 6, this new PID for mobile device 16 may have a lower cost to a PID that includes gateway 10B than to a PID that includes gateway 10A. In some instances, movement 18 of mobile device 16 causes ALTO server 20 to update a cost map for cellular network 6 based at least on the new physical location of mobile device 16 in addition to, or instead of, modifying the network map for cellular network 6.

As a result, in contradistinction to topology only-based or static configuration ALTO techniques, mobile device 16 is dynamically aggregated into a PID for an ALTO network map for cellular network 6 based on a location of the mobile device rather than a network address/subnet of the mobile device. Because a physical location for mobile device 16 may affect latency and other performance metrics for application data transport from CDN nodes 24, using the ALTO network map and cost maps for cellular network 6 may improve application performance by improving selection, using an ALTO service, of a CDN node 24 with which to serve content to mobile device 16, which may attach to different base stations 14 while in motion in the serving area of cellular network 6.

CDN-ALTO server 30 improves selection of a CDN node 24 in the CDN 8 domain for mobile device 16 in the cellular network 6 domain by providing an ALTO service. In accordance with these techniques, CDN-ALTO server 30 comprises ALTO client 32 that uses an ALTO protocol to request and receive, from ALTO server 20 of cellular network 6, the network map and cost map for cellular network 6. CDN-ALTO server 30 then combines the respective network and cost maps for the respective networks into master network and cost maps for use in CDN node 24 selection by request router 26. CDN-ALTO server 30 provides these maps to ALTO clients, such as CDN-ALTO client 28 of request router 26, to improve CDN nodes 24 selection by request router 26. Further example details regarding applying ALTO services within multiple administrative domains can be found in Penno et al., U.S. patent application Ser. No. 12/861,645, entitled "APPLICATION-LAYER TRAFFIC OPTIMIZATION SERVICE SPANNING MULTIPLE NETWORKS," filed Aug. 23, 2010, the entire contents of which are incorporated herein by reference. In some embodiments, CDN-ALTO server 30 generates a master cost map and a master network map in accordance with an assigned PID-type. For example, CDN-ALTO server 30 may generate a master cost map that includes inter-PID costs for PID pairs having members drawn from different PID types.

CDN-ALTO client 28 requests and receives, from CDN-ALTO server 30, the master network and cost maps. In some instances, CDN ALTO server 30 sends respective network maps for CDN 8 and cellular network 6 to CDN-ALTO client 28. Mobile device 16 sends content request 38 to request router 26. Request router 26 queries the master cost map to select the lowest-cost node from among CDN nodes 24 for mobile device 16 and returns a network address for the selected CDN node for the content request in content response 40. Request router 26 uses the master network map to map the source IP address of mobile device 16 to a PID in the master cost map. In some embodiments, may use the network map for cellular network 6 to map the source IP address of mobile device 16 to a PID in the master cost map. Request router 26 then uses the master cost map to select the lowest-cost CDN node 24 for the mapped PID. In accordance with the techniques described, request router 26 selects CDN node 24B as being more proximate to mobile device 16 (after movement 18) based on location information provided by mobile device 16 to ALTO server 20 in a location update message.

Mobile device 16 establishes communication session 42 (e.g., a TCP session) with CDN node 24B to obtain the requested content. In one instance, a user operating an Internet browser application types a Uniform Resource Identifier (URI) in the address bar, causing the application to send an (in this example) HTTP request that includes the URI to request router 26. Request router 26 maps the URI to CDN nodes 24 that are HTTP servers and store the content for the URI (e.g., a web page), selects CDN 24B of the mapped nodes using the master cost map, then returns an HTTP response that includes the network address for the selected node to the browser application running on mobile device 16. The browser application may then send a second HTTP request to the selected CDN node 24B via communication session 42 to obtain the sought-after content.

In another example, a browser application operating on mobile device 16 issues a content request to request router 26 operating as a DNS server to resolve the domain. In this example, request router 26 returns a network address for a selected node to the browser application of mobile device 16, which then uses the resolved network address to request content in transactions for the service session.

Incorporating location information into an ALTO service may thus enable request router 26 to select one of CDN nodes 24 for an application operating on mobile device 16 in a manner that reduces a distance between the selected CDN node 24 and mobile device 16 versus unselected CDN nodes. Because distance between a network source and network destination strongly correlates to transport latency, reducing such distance using the location-based selection techniques herein described may reduce the transport latency of content delivery from the source to the destination. In addition, because CDN 8 may be operated by a content provider and span multiple delivery networks, accounting for physical locations of mobile devices when selecting one of CDN nodes 24 for mobile device 16 may reduce peering and transport costs. The described techniques may thus extend the benefits of the ALTO service to mobile devices.

Figure 2:
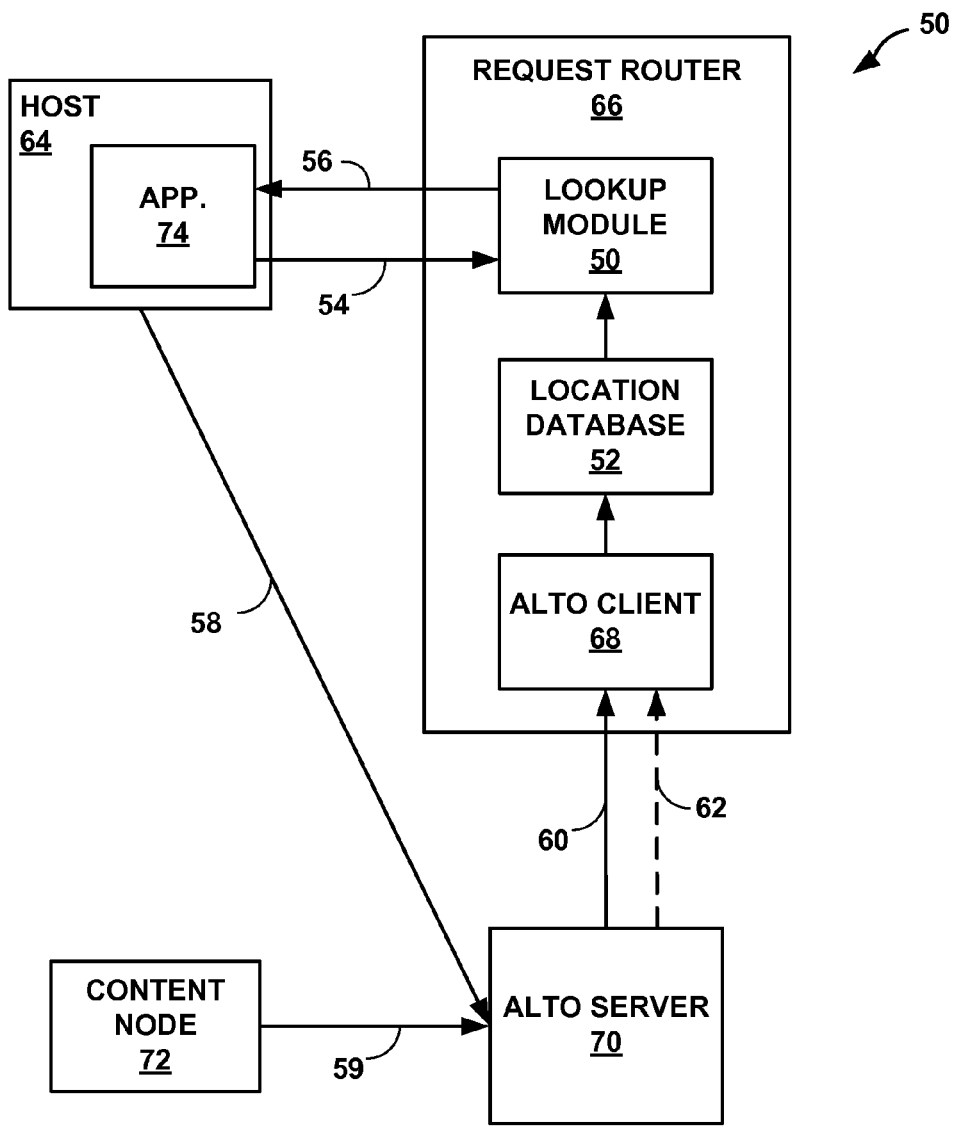
FIG. 2 is a block diagram illustrating an exemplary network system in which devices perform location-based ALTO service techniques described in this disclosure.

FIG. 2 is a block diagram illustrating exemplary network system 50 in which request router 66, ALTO server 70, content node 72, and host 64 perform techniques described in this disclosure. Content node 72 sources content for a distributed application, such as a client-server application utilizing a CDN or a P2P application. Request router 66 is a content- or service-aware device, such as an HTTP redirector or a DNS server. Request router 66 and ALTO server 70 may represent request router 26 and CDN-ALTO server 22 of FIG. 1, respectively. Alternatively, request router 66 may represent ALTO server 20 of FIG. 1. Content node 72 may represent any of CDN nodes 24 of FIG. 1. In a P2P-based implementation, content node 72 may represent an application peer, such as a mobile or other device. Request router 66 may be responsible for a fixed set of host PIDs and be provisioned with information indicating this responsibility prior to receiving content requests.

ALTO client 68 of request router 66 requests and receives, from ALTO server 70, a network map and cost map for the distributed application in complete maps upload message 60. ALTO client 68, in a P2P network, may be an application tracker that obtains the maps from ALTO server 70 and integrates the maps into a peer database.

Host 64 comprises application 74 that constitutes a portion of the distributed application discussed above. For example, application 74 may be a peer of a P2P application or a client of a client-server application. Application 74 may be an Internet browser. Host 64 may represent mobile device 16 of FIG. 1. Host 64 includes a global positioning system (GPS) receiver that receives signals from the GPS that host 64 uses to generate latitude and longitude coordinates that identify a location of host 64 on the Earth. These coordinates are referred to as a physical location of host 64. In some embodiments, host 64 uses an alternative measure for a physical location. For example, host 64 may provide a user interface that allows a user to enter a physical location as, for example, a city and state, or a street address. As another example, host 64 may use an identifier for the base station with which the host exchanges wireless signals as a physical location value. Various base stations of a cellular network cover different locations and thus a base station identifier correlates to a physical location for mobile devices served by the base station identifier. As still further examples, host 64 may send a Wi-Fi connection location identifier or GSM localization information or other time difference of arrival (TDOA) information as a physical location for the host.

Application 74 obtains the physical location from host 64 and provides to ALTO server 70 a location update 58 that includes the physical location. Because the physical location may change with any movement of host 64 over Earth's surface, application 74 may provide location update 58 periodically, for instance, or in response to large movements (e.g., greater than 10 miles), or prior to or coincident with making a content request to an application server. In this way, application 74 may avoid burdening network resources with frequent updates. In some embodiments, application 74 may embed location update 58 in the content request, thus providing location information to ALTO server 70 only when ALTO server 70 is to resolve the request for host 64 to a particular content node. In addition, content node 72 may provide location update 59 to ALTO server 70 when, for example, content node 72 is a mobile peer of host 64. When content node 72 is a CDN node, for instance, an administrator may configure ALTO 70 with a location for the content node.

ALTO server 70 receives location update 58 and uses the information contained therein to, if appropriate, modify a network map and cost map for the distributed application for a network that includes host 64 to incorporate the physical location of host 64 into the maps in accordance with the techniques herein described. ALTO server 70 may comprise policies for creating network and cost maps using the physical location of network nodes. As used herein, a "policy" specifies an action that is to be taken upon occurrence of a condition.

For example, if physical location information in location update 58 indicates host 64 is currently in closer proximity to hosts of a second network map PID in which host 64 is not currently a member than to hosts of first network map PID in which host 64 is currently a member, ALTO server 70 may modify the network map to transfer host 64 to the second PID. As another example, ALTO server 70 may organize PIDs according to BST identifiers for the hosts, such that ALTO server 70 groups hosts that are served by the same BST or groups hosts that are served by one of a group of base station controlled by the same controller, such as a base station controller (BSC) or radio network controller (RNC). In this example, ALTO server 70 may include a database of base station or other radio access network records that describe base station routing, serving, and/or physical locations.

In addition, ALTO server 70 may modify the cost map to account for changes in the host 64 physical location. For example, ALTO server 70 may increase an inter-PID cost for PID pairs that include a PID to which host 64 to account for additional bandwidth that may be allocated to serve content requests issued from application 74.

In the illustrated example, ALTO server 70 issues incremental map updates to ALTO client 68 upon changes to the network and/or cost maps, or when requested by the ALTO client. ALTO server 70 determines a difference between a previous network map and cost map and the network map and cost map that ALTO server 70 generated as a result of receiving location update 58. In addition, ALTO server 70 generates instructions to enable ALTO client 68 to modify the network map and cost map, received by ALTO client 68 in complete maps upload message 60, to reflect the changes to the application topology. ALTO server 70 then sends these instructions to ALTO client 68 in update message 62. Upon receiving update message 62, ALTO client 68 modifies location database 52 comprising the network map and cost map for application 74 using the instructions contained in the update message 62. In some embodiments, ALTO server 70 foregoes incremental map updates in favor of additional complete maps upload messages 60 to synchronize changes to the network and cost maps. Further example details regarding incremental ALTO service map updates can be found in Raghunath et al., U.S. patent application Ser. No. 12/861,681, entitled "APPLICATION-LAYER TRAFFIC OPTIMIZATION SERVICE MAP UPDATES," filed Aug. 23, 2010, the entire contents of which are incorporated herein by reference.

Upon updating ALTO server 70 with a physical location of host 64 using location update 58, application 74 of host 64 sends content request 54 to request router 66. Lookup module 50 of request router 66 responds by querying the network and cost maps for the distributed application as updated by ALTO client 68 after receiving update message 62 directing request router 66 to update the ALTO service maps to account for the new physical location of host 64. Lookup module 50 selects the lowest-cost node, e.g., content node 72, from which to source the requested content and returns a network address for the selected node to application 74 in content response 56. In some embodiments, lookup module 50 is an HTTP server. Content response 56 may include an HTTP redirect message, such as an HTTP 302 redirect message. Location update 58 may also improve application operation when application 74 operates as a P2P server by enabling request router 66 to select host 64 as an optimum content serving node for a requesting P2P client.

In some embodiments, ALTO server 70 implements an endpoint cost service. In such embodiments, ALTO client 68 provides a list of one or more endpoints, such as content node 72, and an identifier for host 64 to ALTO server 70. ALTO server 70 uses network and cost maps generated in accordance with the location-based techniques herein described to determine an optimal endpoint in the list of endpoints received for host 64. ALTO server 70 returns the optimal endpoint to ALTO client 68 for relay to application 74 of host 64. In some embodiments of ALTO server 70 that implement an endpoint cost service, ALTO server 70 returns a list of the endpoints in a rank ordering according to cost or a list of the endpoints with associated costs for each endpoint.

The location-based ALTO map service techniques described above may enhance application performance by enabling selection of a serving node for an application based at least upon proximity between the requesting client and the candidate serving nodes.

Figure 3:
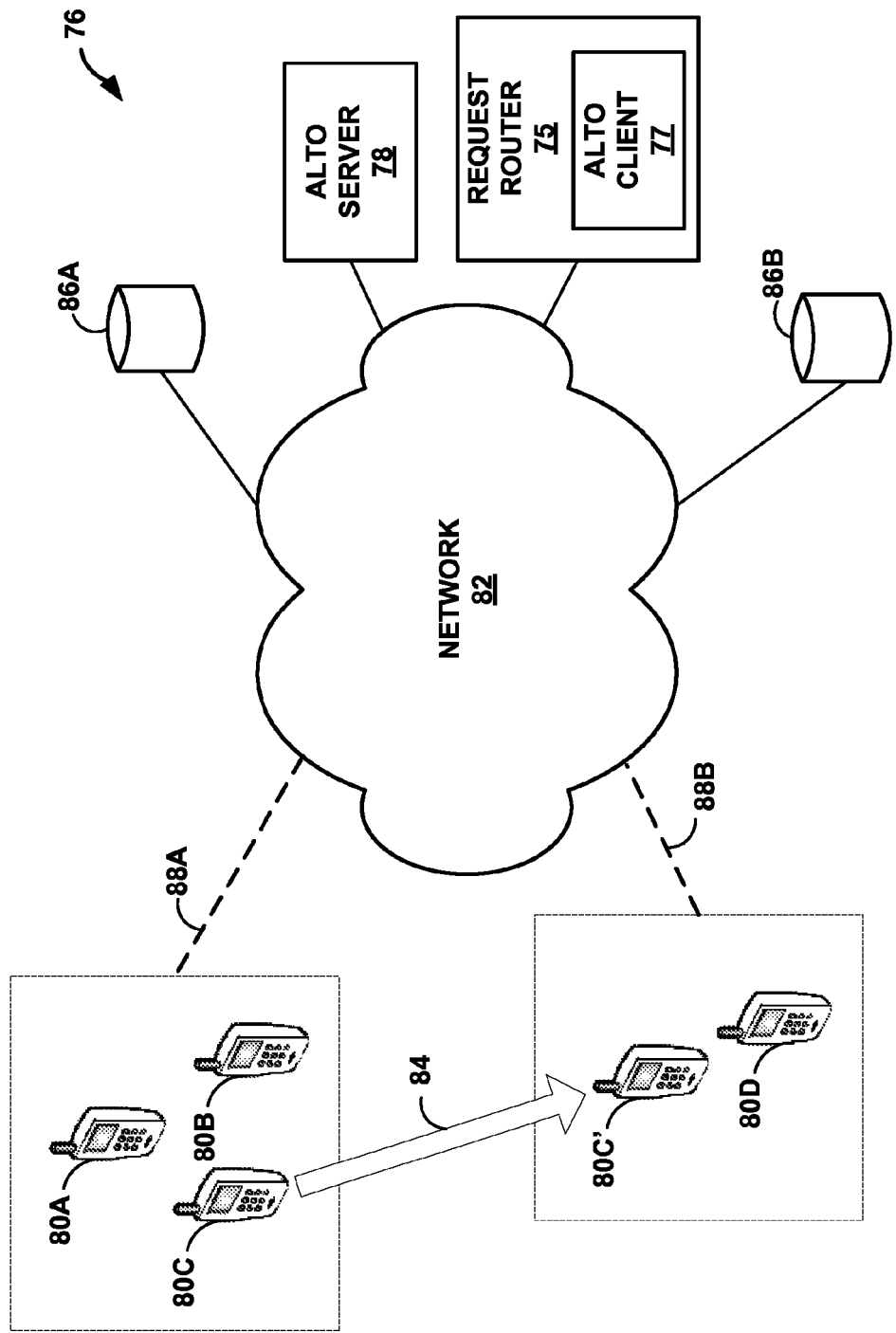
FIG. 3 is a block diagram illustrating an exemplary network system in which an ALTO server and a number of mobile devices perform the location-based ALTO service techniques described herein.

FIG. 3 is a block diagram illustrating an exemplary network system 76 in which ALTO server 78 and mobile devices 80A-80D ("mobile devices 80") perform the physical location-based ALTO techniques described herein. Network 82 is a packet-based network that transports data traffic from content servers 86A-86B ("content servers 86") to one or more of mobile devices 80 each connected to network 82 via one of wireless access links 88A-88B. Network 82 supports one or more packet-based services provided by content servers 86 that are available for request and use by any of mobile devices 80. As examples, network 82 in conjunction with content servers 86 may provide bulk data delivery, voice over Internet protocol (VoIP), Internet protocol television (IPTV), Short Messaging Service (SMS), and Wireless Application Protocol (WAP) service. Network 82 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates a mobile service provider network, an enterprise IP network, or some combination thereof. In various embodiments, network 82 is connected to a public WAN, the Internet, or to other networks. Network 82 executes one or more packet data protocols (PDPs), such as IP (IPv4 and/or IPv6), X.25 or Point-to-Point Protocol (PPP), to enable packet transport for server 86 services.

In some embodiments, network 82 may comprise a mobile service provider network, or "content access network." For example, network 82 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Network 82 may, alternatively or in conjunction with one of the above, implement a code division multiple access-2000 ("CDMA2000") architecture. Network 82 may, again as an alternative or in conjunction with one or more of the above, implement a WiMAX architecture defined by the WiMAX forum. In such embodiments, content servers 86 may be "embedded" in network 82 by coupling, via a communication link, to a serving node (e.g., an Serving GPRS Support Node), a gateway node (e.g., a Gateway GPRS Support Node), or an intermediate transport node within network 82.

An ALTO server 78 receives location information for endpoints, including mobile devices 80 and content servers 86, for an application that exchanges data using network 82. In addition, ALTO server 78 stores location information for content servers 86. An administrator may, for example, configure ALTO server 78 with such location information. ALTO server 78 may represent an embodiment of ALTO server 20 of FIG. 1 or ALTO server 70 of FIG. 3. In some embodiments, content servers 86 and mobile devices 80 may represent application peers in a P2P network. In some embodiments, content server 86 and mobile devices 80 represent servers and clients, respectively, executing a client-server application.

ALTO server 78 uses the location information received for the endpoints to aggregate the endpoints, including mobile devices 80 and content servers 86, into PIDs based at least on proximities of the endpoints to one another. In other words, ALTO server 78 groups endpoints that are close to one another into the same PID. A threshold for endpoint proximity is typically specified according to an administrator-defined threshold. As illustrated, ALTO server 78 groups mobile devices 80A-80C into a first PID and mobile device 80D into a second PID at an initial state. Mobile device 80C, typically by operation of a user, moves into proximity to mobile device 80D with movement 84. Mobile device 80C sends ALTO server 78 a location update message that includes information describing the new physical location of mobile device 80C.

Because mobile device 80C is now proximate to 80D, ALTO server 78 modifies the PIDs to transfer mobile device 80C to the second PID. ALTO server 78 uses the modified PIDs to generate network and cost maps for an ALTO service. ALTO client 77 of request router 75 requests and receives the ALTO service maps (i.e., the generated network and cost maps) from ALTO server 78. When mobile devices 80 request services, such as a content file, request router 75 selects the lowest-cost one of content servers 86 for the requesting mobile device using the ALTO service maps. In this manner, ALTO server 78 provides an ALTO service that may enable request router 75 to improve a performance of applications based on locations of application endpoints.

In some embodiments of network system 76, mobile devices 80 implement a peer-to-peer (P2P) network to exchange content in addition to, or instead of, receiving content from content servers 86. In such embodiments, each of mobile devices 80 includes an ALTO client to request and receive network and cost maps generated in accordance with the location-based techniques described herein. A particular one of mobile devices 80 seeking content uses the received network and cost maps as described above to determine the lowest-cost PID that includes one mobile devices 80 from which to obtain requested content. As another example, ALTO server 78 may implement an endpoint cost service that ALTO clients of mobile devices 80 may use to determine a rank ordering of mobile devices 80 to serve content. In a P2P implementation, mobile devices 80 or a centralized server may provide a resource discovery service to determine the mobile devices 80 available to serve the requested content. One of mobile devices 80 may provide a list of mobile devices 80 available to the serve the requested content to ALTO server 78 implementing an endpoint cost service and receive, from the ALTO server, the list in a rank for or a list of the provided mobile devices 80 with associated costs.

Figure 4A:
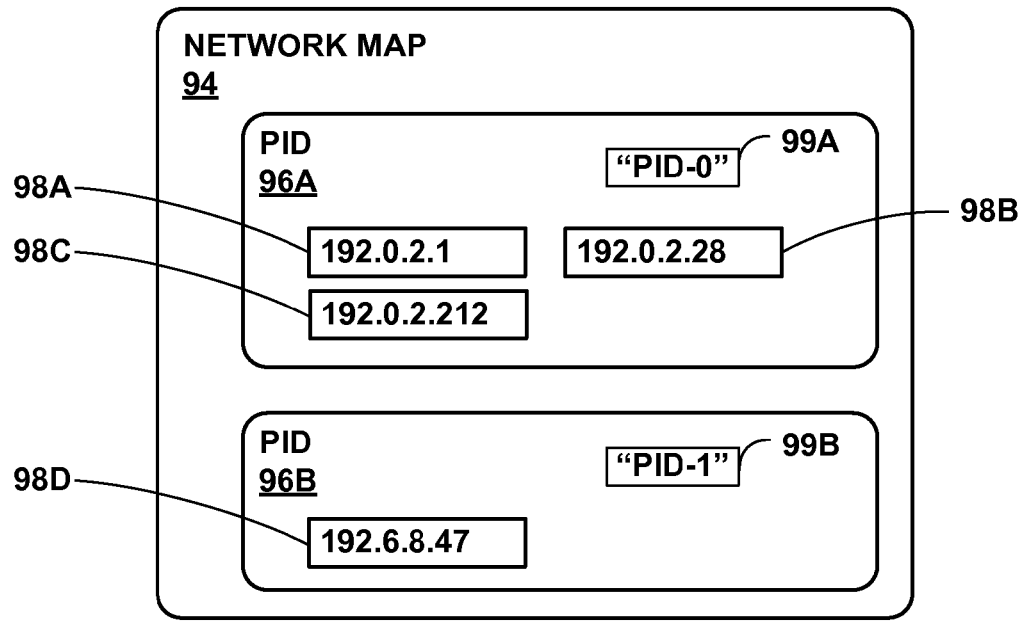
FIGS. 4A-4B illustrate a portion of an exemplary ALTO network map prior to and subsequent to reorganization due to device mobility.
Figure 4B:
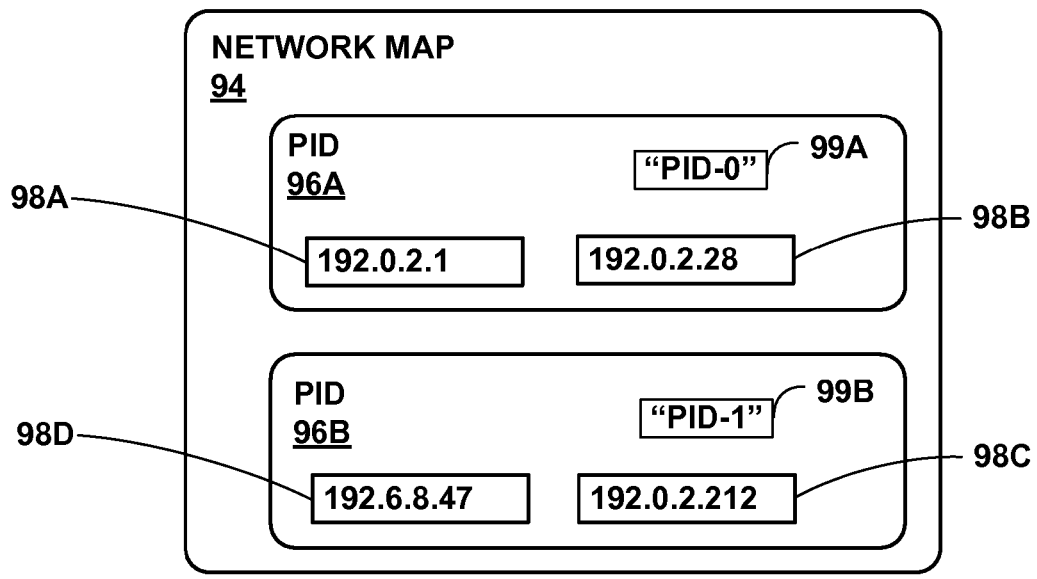

FIGS. 4A-4B illustrate exemplary network map 94, created by an ALTO server in accordance with an ALTO service and the techniques of this disclosure, prior to (FIG. 4A) and subsequent to (FIG. 4B) reorganization to transfer a host from PID 96A to PID 96B to account for a change in the physical location of the host.

Network map 94 of FIG. 4A comprises a set of network location identifiers ("PIDs") 96A-96B ("PIDs 96") each identified by a respective one of network location identifier values 114A-114C. Each of PIDs 96 constitutes an indirect and network-agnostic aggregation mechanism to represent, for instance, one or more individual endpoints, one or more subnets, metropolitan areas, points of presence ("PoPs"), one or more autonomous systems, or any combination thereof. For instance, PID 96B represents an endpoint having IP address 192.6.8.47 and has the network location identifier value "PID-1." Aggregation of network endpoints into PIDs 110 provides scalability and privacy by decoupling network endpoints from their identifiers in the ALTO context. In particular, aggregation reduces the size of costs maps by reducing the size of the network and masks the network topology underlying a particular PID (representing, e.g., an autonomous system). In some instances, network map 94 includes additional PIDs to represent serving nodes of a CDN.

An ALTO server aggregates PIDs 96 of network 94 in accordance with one or more policies that are conditioned at least on geographical proximities among one or more of endpoints 98. That, the ALTO server receives physical location information for the endpoints and, based at least on this physical location information, organizes the endpoints 98 into PIDs 96. As described above, in some embodiments, the ALTO server aggregates PIDs 96 according to base station identifiers for respective serving base stations for the endpoints 98. In the illustrated network map 94 of FIGS. 4A-4B, endpoints 98A-98D may represent corresponding mobile devices 80A-80D of FIG. 3.

Upon receiving new physical location information for endpoint 98C, the ALTO server reorganizes PIDs 96 to transfer endpoint 98C from PID 96A to PID 96B to generate network map 94 of FIG. 4B. In the modified network map 94 of FIG. 4B, endpoint 98C may represent mobile device 80C' of FIG. 3. In the modified network map 94, while endpoints 98A-98C have a 192.0.2.0/24 network address prefix that is not shared by endpoint 98D, the ALTO server organized PID 96B to include both endpoint 98C and 98C to incorporate, at least in part, endpoint location-based aggregation in network map generation. Modifying network map 94 in this manner with the ALTO server may improve a service node selection behavior of ALTO clients by selecting service nodes based on physical distance to a requesting client instead of, or in addition to, routing distance.

FIGS. 5A-5B illustrate exemplary network maps 100 and 102, respectively, for network system 76 of FIG. 3 prior to and subsequent to movement of mobile device 80C. As one example, network map 100 includes a PID entry that maps mobile devices 80A-80C of FIG. 3 to the PID identified as "PID-0." Upon movement of mobile device 80C to a physical location in closer proximity to mobile device 80D, ALTO server 78 modifies network map 100 to generate network map 102 in accordance with the techniques of this disclosure. Network map 102 includes a PID entry that maps mobile devices 80C-80D to the PID identified as "PID-1."

For ease of illustration, network maps 100 and 102 of FIGS. 5A-5B are shown in a simplified representation. Instances of a more detailed network map is illustrated and discussed below with respect to FIGS. 4A-4B.

FIG. 6 illustrates an exemplary cost map 104 for corresponding network map 102 of FIG. 5B for network system 76 of FIG. 3. Cost map 104 is an adjacency matrix that is expanded into a table of pairwise-PID cost entries. The cost entries provide a total costs to traverse network paths between various mobile devices 80 and various content nodes 86 of FIG. 3 arranged into PIDs of network map 102 and referenced in the cost entries of cost map 104. Because network map 102 includes PIDs aggregated based at least on respective physical locations of mobile devices 80, cost map 104 entries' respective costs may correlate with physical distance between PIDs of the entries.

In the illustrated example, cost map 104 indicates PID-1 including endpoints 80A-80B is has a lower downstream transit cost from content node 86A (in PID-20) than from content node 86B (in PID-21). The lower downstream transit cost may indicate PID-1 is more proximate to PID-20 than to PID-21. When request router 75 of FIG. 3 receives a content request from endpoint 80B, for instance, the request router queries cost map 104 for the lowest-cost PID connected to PID-0. Cost map 104 denotes this PID as PID-20 having total cost 13 to PID-0. Request router 75 uses network map 102 to select one of the endpoints in PID-20 (in this instance, content node 86A) and returns an IP address for content node 86A to endpoint 80B.

In some embodiments, such as a P2P implementation, cost map 104 includes costs between PIDs that include mobile devices 80. For example, in such embodiments, cost map 104 includes an entry for a <PID-0, PID-1> pair to indicate a cost between respective mobile devices 80 of PID-0 and PID-1 to influence serving peer selection.

Figure 7:
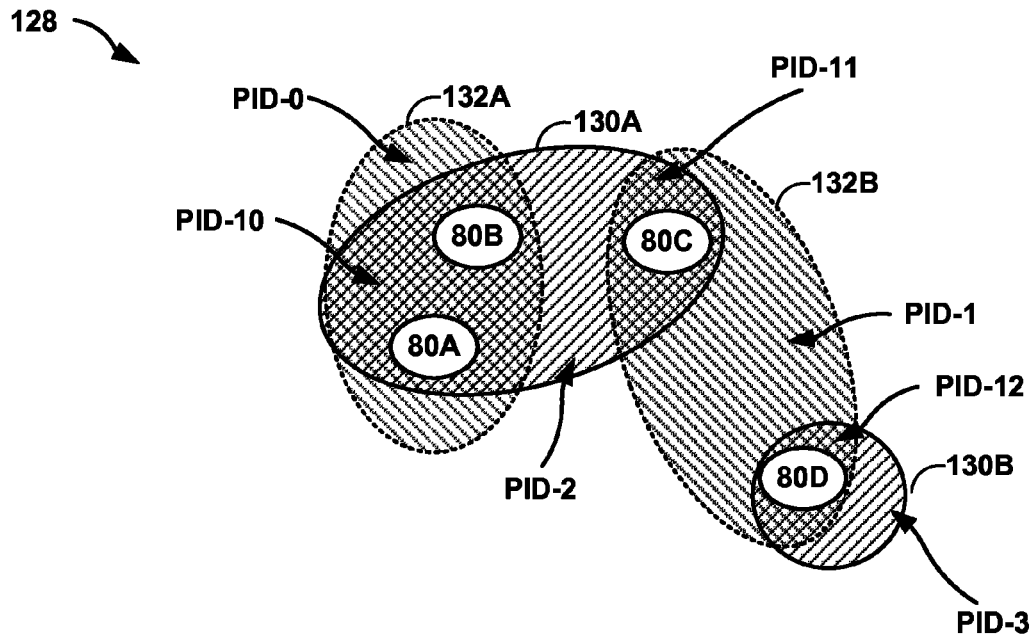
FIG. 7 illustrates an exemplary Euler diagram that represents intersections of an exemplary set of endpoints aggregated into PIDs according to multiple criteria.

FIG. 7 illustrates an exemplary Euler diagram 128 that represents intersections of an exemplary set of endpoints aggregated into PIDs according to multiple different criteria. The set of endpoints represented are mobile devices 80A-80D of FIG. 3. ALTO server 78 of FIG. 3 aggregates mobile devices 80A-80C into PID-2 represented by set 130A according to a network topology. That is, ALTO server 78 policies specify aggregating mobile devices 80A-80C because these devices are similarly situated in a network topology. ALTO server 78 aggregates mobile device 80D to PID-3 represented by set 130B because this device is differently situated from the other mobile devices.

In accordance with the techniques of this disclosure, ALTO server 78 policies also specify aggregating mobile devices 16 according to a physical location topology. For a physical location topology, ALTO server 78 aggregates mobile devices 80A-80B into PID-0 represented by set 132A because these devices are located proximate to one another, where proximate is defined by an aggregation policy. ALTO server 78 aggregates mobile devices 80C-80D into PID-1 represented by set 132B.

To generate a network map for use in an ALTO service, ALTO server 78 may intersect the two sets 130, 132, representing the network and physical location topologies, respectively, to create an intersection topology, as illustrated in Euler diagram 128. ALTO server 78 generates intersection PIDs from mobile devices 80 that constitute the various intersections of the two sets 130, 132. An intersection PID is a group of endpoints (e.g., mobile devices 80) that constitute the intersection of two or more sets of endpoints, where each of the sets is a PID group aggregated for a different topology dimension. In the illustrated example, intersection PID-10 comprises mobile devices 80A-80B, intersection PID-11 comprises mobile device 80C, and intersection PID-12 comprises mobile devices 80D. ALTO server 78 may then generate the network map for the ALTO service using the topology represented by the intersection PIDs. In this way, ALTO server 78 incorporates both topologies into the ALTO service to account for multi-dimensional factors (in this case, network and physical location) that affect application performance.

In various embodiments, Euler diagram 128 may represent and ALTO server 78 may generate intersection PIDs for multiple different topologies. For example, ALTO server 78 may create one or more topologies that represent various combinations of physical location, routing distance, network location, administrative entity, serving node capability, base station identifier, cell identifier, and mobile device capability dimensions, for example. Using cell identifier or base station identifier topologies may, for example, allow the ALTO server to prioritize, for a given client, a server in a cell that is not shared with the client. In addition, while illustrated and described for explanatory purposes as comprising separate aggregation steps for individual topology PIDs and intersection PIDs, ALTO server 78 may generate intersection PIDs according to a policy that combines conditions from among multiple topological dimensions.

Figure 8:
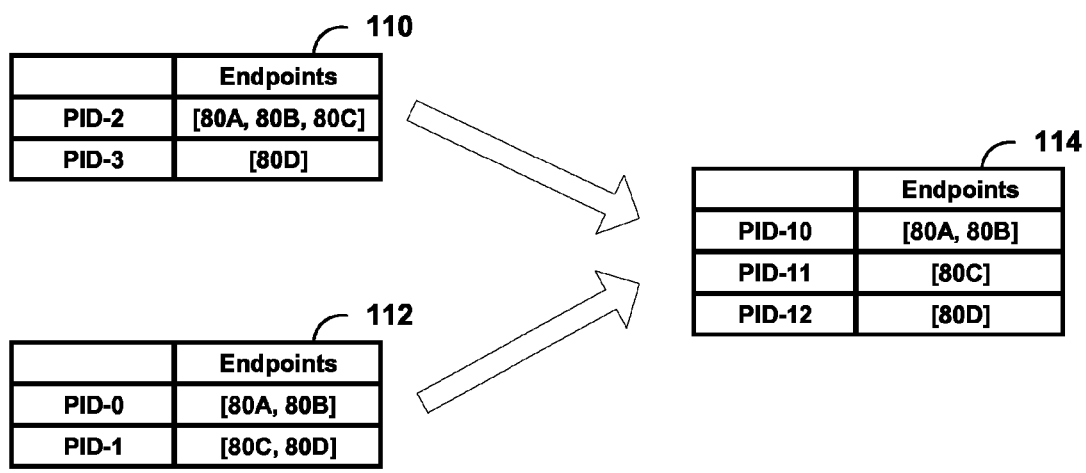
FIG. 8 illustrates an exemplary ALTO network map that represents intersections of an exemplary set of endpoints aggregated into PIDs according to multiple criteria.

FIG. 8 illustrates network map 114 generated by intersecting preliminary network maps 110, 112. FIG. 8 is a tabular representation of Euler diagram 128 of FIG. 7. Thus, preliminary network map 110 represents PID-2, PID-3 of FIG. 7, and preliminary network map 112 represents PID-0, PID-1. That is, preliminary network 110 is based on a network topology of mobile devices 80 in a network, while preliminary network 112 is based on a physical location topology of mobile devices 80. An ALTO server, such as ALTO server 78, intersects preliminary network maps 110, 112 to generate network map 114 that includes intersection PIDs (PID-10, PID-11, and PID-12) of the PIDs of the preliminary network maps. For example, PID-10 includes mobile devices 80A-80B. Network maps 110, 112, 144 may in some instances additionally comprise PIDs for content nodes 86 of FIG. 3.

Figure 9A:
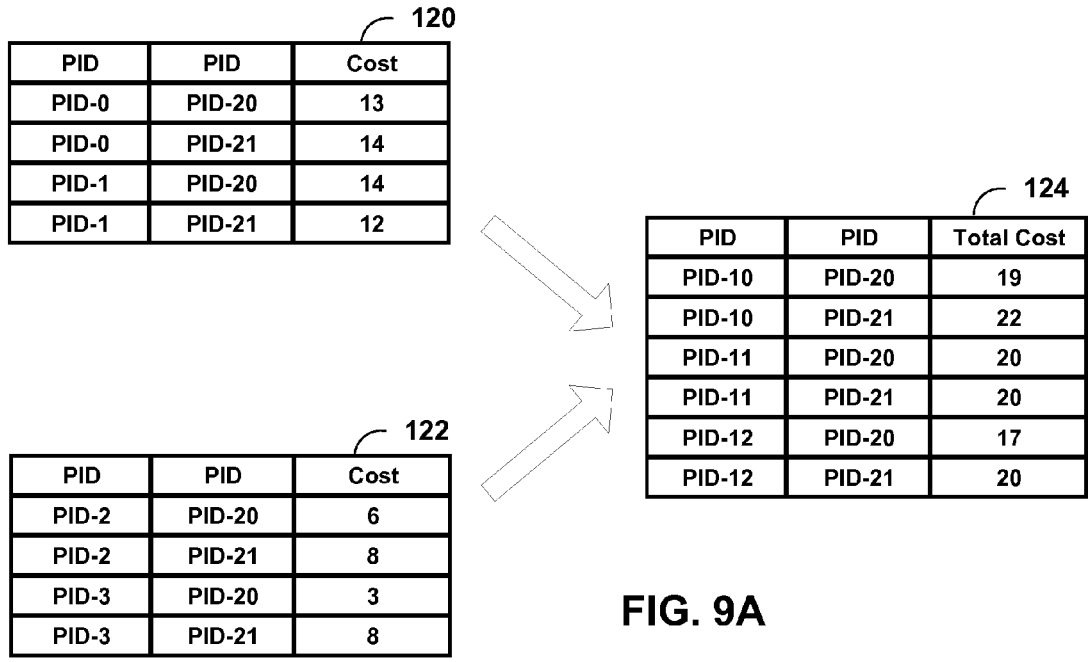
FIGS. 9A-9B illustrate exemplary ALTO cost maps.

FIG. 9A illustrates an exemplary cost map 124 computed using preliminary cost maps 120, 122. Preliminary cost map 120 is a reproduction exemplary cost map 104 of FIG. 6 for corresponding network map 102 and preliminary network map 112 for network system 76. That is, preliminary cost map 120 is an adjacency matrix that is expanded into a table of cost entries for PID pairs of network map 102 that include both a PID that includes a mobile device and a PID that includes a serving node. Because network map 102 includes PIDs aggregated based at least on respective physical locations of mobile devices 80, preliminary cost map 120 entries' respective costs may correlate with physical distance between PIDs of the entries.

Preliminary cost map 122 is an exemplary cost map for preliminary network map 110 of FIG. 8 expanded to include PIDs for content nodes 86. That is, preliminary cost map 122 is an adjacency matrix that is expanded into a table of cost entries for PID pairs that include both a PID that includes a mobile device and a PID that includes a serving node. As ALTO server 78 generates preliminary network map based on network topology of the mobile devices and serving nodes, ALTO server 78 generates preliminary cost map 122 having cost values that provide an estimated total cost to traverse a network path between mobile device PIDs and serving node PIDs. In some embodiments, cost maps 110, 112, and 114 include entries for each PID pair in a network map, rather than merely host-serving node pairs. Such expansion may be appropriate, for example, in a P2P application where each peer may be both a client and a server.

Cost map 124 includes intersection PIDs of network map 114 of FIG. 8. Cost map 124 is an adjacency matrix that is expanded into a table of cost entries for PID pairs that include both an intersection PID and a PID that includes a serving node. ALTO server 78 generates cost map 124 by summing the adjacency matrices of preliminary cost maps 120, 122. Specifically, for each intersection PID, ALTO server 78 adds a first cost for the first topology with a second cost for the second topology. For example, PID-11 is an intersection of PID-1 of the physical location topology and PID-2 of the network topology. To generate a cost value for cost map 124 for the <PID-11, PID-20> pair, for example, ALTO server 78 thus adds cost values for the <PID-1, PID-20> pair of cost map 120 and the <PID-2, PID-20> pair of cost map 122. In some instances, ALTO server 78 includes policies that assign various weights to the different topologies. Rather than simply sum cost values of preliminary maps 120, 122, ALTO server 78 policies may assign a larger weight to physical location topology edge values and thus signify a greater cost significance to physical location than other topology types.

Cost map 124 thus provides, for ALTO server 78 and request router 75, a total cost to traverse a path between any of mobile devices 80 and any of content nodes 86, where the total cost accounts for multiple cost factors, including physical distance and network routing distance. Other instances of cost map 124, like network map 114, may incorporate additional factors, including network location, administrative entities, serving node capabilities, base station identifiers, and mobile device capability, for example.

Figure 9B:
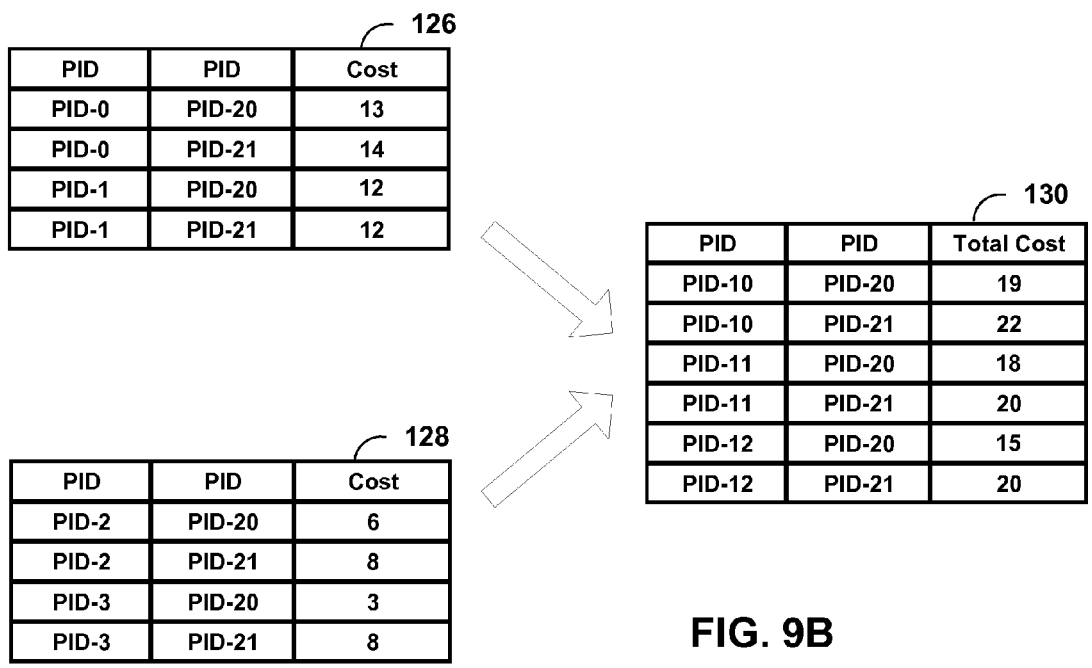

FIG. 9B illustrates exemplary cost map 130 computed using preliminary cost maps 126, 128. Preliminary cost map 126 represents preliminary cost map 120 of FIG. 9A after ALTO server 78 receives a location update from one or more of the mobile devices 80 of PID-1 that causes ALTO server 78 to modify the preliminary cost map to change the cost of the <PID-1, PID-20> pair. As a result, ALTO server 78 updates exemplary cost map 130 to account for the new, lower cost of the <PID-1, PID-20> pair by modifying costs for the <PID-11, PID-20> pair and <PID-12, PID-20> pair, which are intersections of PID-1 of the physical location topology according to FIG. 7. In this way, ALTO server 78 may provide updates of cost map 130 to requesting ALTO clients to improve serving node selection. In some embodiments, ALTO server 78 may implement an endpoint cost service using cost map 130 updated in accordance with the location-based techniques herein described.

Figure 10:
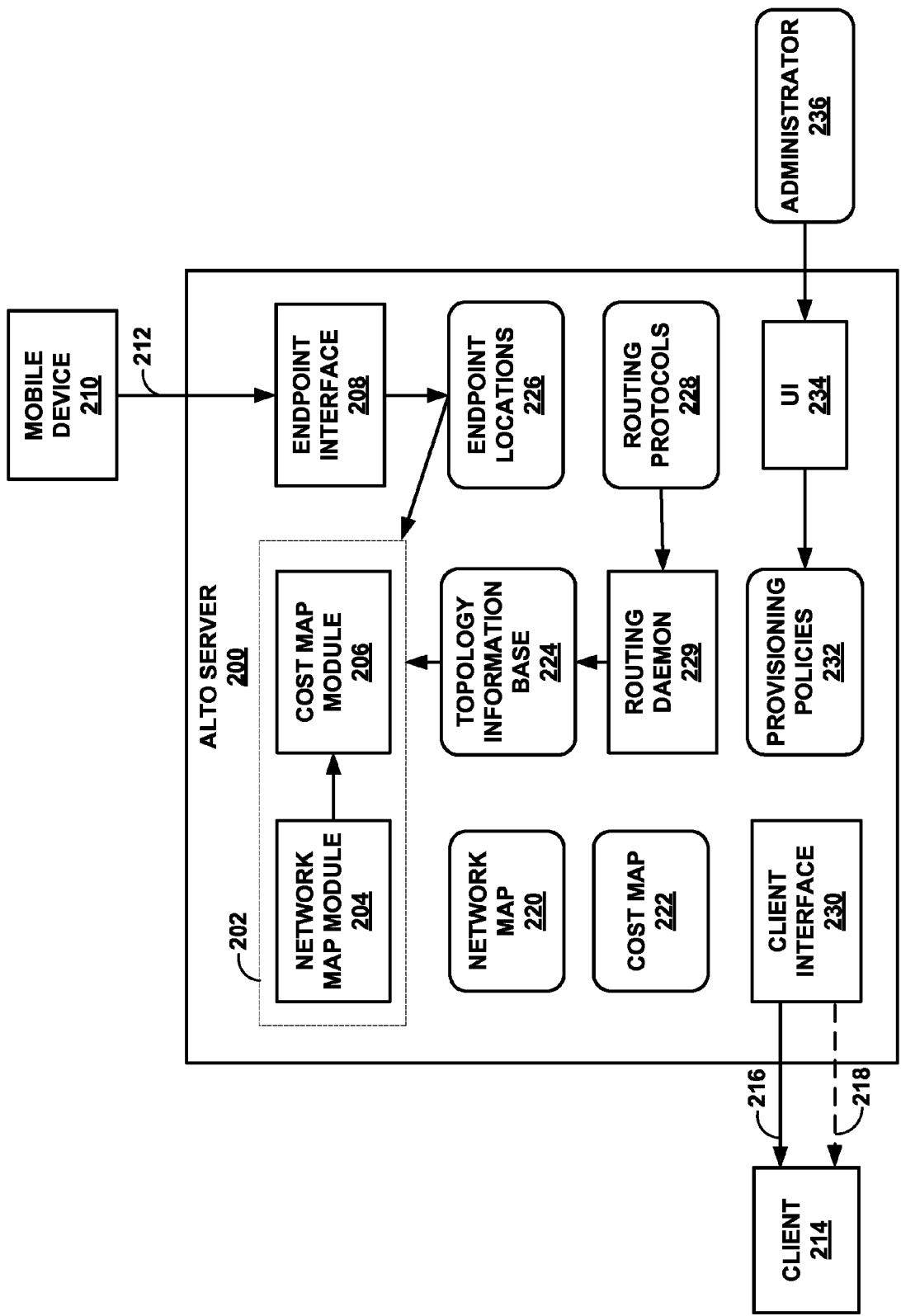
FIG. 10 is a block diagram illustrating, in detail, an example ALTO server that performs location-based traffic optimization techniques according to this disclosure.

FIG. 10 is a block diagram illustrating, in detail, an example ALTO server 200 that performs location-based traffic optimization techniques according to this disclosure. ALTO server 200 may represent an embodiment of ALTO server 20 of FIG. 1, ALTO server 70 of FIG. 2, or ALTO server 78 of FIG. 3. ALTO server 200 may be a server, computing device or other appliance that includes one or more microprocessors that provide an operating environment for one or more software module for generating and outputting ALTO network and cost maps in accordance with the described techniques. For purpose of clarity, components, such as a microprocessor, memory, keyboard, display, an operating system, network drivers and other components commonly found in such a computing device or appliance are not shown in FIG. 10. In some embodiments, ALTO server 200 comprises a router that includes one or more services units to apply services such as ALTO services as described herein. The services units may be distributed over one or more service cards or blades (not shown) that are inserted into rack slots of a router.

Map modules 202 of ALTO server 200 generate network map 220 and cost map 206 based at least on physical locations of one or more endpoints of a network served by ALTO server 200. In addition, in the illustrated embodiment, ALTO server 200 comprises topology information base 224, a data structure that includes information regarding network topology, transmission costs for various network links, and other information that may be used by map modules 202 to generate ALTO-based maps. Network map module 204 uses topology information base 224 to generate network map 220 and cost map module 206 uses topology information base 224 to generate cost map 222. Routing daemon 229 executes routing protocols 228 to provision topology information base 224 with route information. In addition, administrator 236 may connect to user interface 234 ("UI 234") to upload tables or other data structures that include topology information to topology information base 224. In some embodiments, map modules 202 generate network map 220 and cost map 206 in a manner that does not account for network topology or other information stored by network information base 224. That is, in such embodiments, ALTO server 200 does not include routing protocols 228 or network information base 224 and instead bases network map 220 and cost map 222 generation on a physical location topology rather than a network topology.

User interface 234 may be a command-line interface (CLI), a graphical user interface (GUI), a remote procedure call (RPC), or some other method to enable administrator 236 to configure topology information base 224, provisioning policies 232 of ALTO server 200, and, in some instances, endpoint locations 226. Administrator 236 may be a network operator of, e.g., a service provider network, or a software agent executing, e.g., on a network management device. For endpoints that do not have location update functionality, including non-mobile endpoints such as CDN nodes, administrator 236 configures entries for the endpoints with associated locations in endpoint locations 226. Administrator 236 provisions ALTO server 200 with provisioning policies 232, a set of policies that cause network map module 204 to generate network map 220 and cost map module 206 to generate cost map 206 in accordance with administrator 236 preferences relating to physical locations, transmission costs, load balancing, service-discrimination, PID grouping, or other preference areas.

Endpoint interface 208 receives location update 212 from mobile device 210 and uses the information contained therein to, if appropriate, modify a network map and cost map for the distributed application for a network that includes mobile device 210 to incorporate a physical location for the mobile device into the maps in accordance with the techniques herein described. Mobile device 210 may represent an embodiment of one of mobile devices 16 of FIG. 1 or mobile devices 80 of FIG. 3. Endpoint interface 208 may comprise, for example, a simple network management protocol (SNMP) agent that connects to mobile device 210 or to a centralized network management server to request location update 212. Endpoint interface 208 may expose an application programming interface (API), which may comprise a Web service or an Extensible Messaging and Presence Protocol (XMPP)-based API for use by mobile device 210 to provide location update 212. Endpoint interface 208 may poll mobile device 210 for location update 212.

Endpoint locations 226 of ALTO server 200 is a data structure comprised of entries that map endpoints, such as mobile device 210, other mobile devices, or other nodes of a network served by ALTO server 200, to a respective physical location. Each entry of endpoint locations 226 includes an identifier for each endpoint and one or more values to represent the physical location of the endpoint. An endpoint identifier may include, for instance, a network address, MAC address, International Mobile Equipment Identity (IMEI), International Mobile Subscriber Identity (IMSI), URL, or some combination thereof. Physical location values for an endpoint may include, for example, geographical locations in the form of longitude/latitude coordinates, a base station or mobile network component identifier, a geographic address (e.g., city, state and/or street address), a Wi-Fi connection location identifier, and GSM localization information or other time difference of arrival (TDOA) information. Endpoint locations 226 may comprise a table, database, linked list, or other associative data structure.

When endpoint interface 208 receives location update 212 from mobile device 210, endpoint interface 208 updates an existing entry for mobile device 210 with the location values included therein. If an entry for mobile device 210 is not present in endpoint locations 226, endpoint interface 208 creates a new entry using the identifier and physical location of the endpoint included in location update 212.

In accordance with the techniques of this disclosure, provisioning policies 232 includes policies for creating network and cost maps based at least on a physical location of mobile devices, e.g., mobile device 210, in a network served by ALTO server 200. For example, provisioning policies 232 may include one or more policy rules to cause network map module 204 to aggregate one or more mobile devices located within a specified threshold distance from one another into a network map 220 PID. As another example, provisioning policies 232 may include one or more policy rules to cause network map module 204 to aggregate one or more mobile devices served by a particular base station, identified within the policy rules, into a network map 220 PID. Provisioning policies 232 may include other PID aggregation-related policy rules to perform aggregation based on, for example, the other physical location identifiers listed above.

Provisioning policies 232 may also affect operation of cost map module 206 to generate cost map 222. For example, one or more policy rules of provisioning policies 232 may specify attaching a cost to a PID pair of network map 220 that is calculated based at least on a physical distance between respective devices of the PID pair. In some instances, provisioning policies 232 may include one or more rules that specify costs between particular devices. For example, a policy rule may specify a cost between a particular base station identified in the rule and a particular content node identified in the rule. In this example, for a PID that includes mobile devices served by the particular base station identified in the rule, cost map module 206 may set, in cost map 222, the inter-PID cost from that PID to a PID that includes the particular content node identified in the rule to the cost specified in the rule. In this way, ALTO server 200 may leverage known transport cost factors of a network, such as bandwidth limitations, communication link leasing costs, peering costs, and latency, to improve behavior of applications operating on mobile devices.

As described above with respect to FIGS. 7-9, in some embodiments, map modules 202 may generate network map 220 and cost map 222 in accordance with multiple topologies to account for multi-dimensional factors, such as network and physical location, which affect an application performance. In such embodiments, provisioning policies 232 may include one or more policy rules that specify a manner in which cost map module 206 is to calculate a combined cost map using the individual cost maps for the different topologies. Provisioning policies 232 may weight individual cost maps differently in a cost formula that cost map module 206 uses to combine multiple topologies. For example, administrator 236 may determine a significance of physical location distances exceeds a significance of network topology distance by some factor. Administrator 236 may thus set a coefficient for physical location distance variables in a cost formula to the factor and another quantity based at least on the factor to increase a significance of the physical location topology costs.

Client interface 230 exposes an ALTO server interface to enable ALTO clients, such as client 214, to request and receive network and cost maps for an application for the network. Client interface 230 sends a copy of network map 220 and cost map 222 to client 214 in complete maps upload message 216. Client interface 230 may execute one or more protocols to obtain network addresses of ALTO clients in the network, and the client interface maintains these network addresses so as to push incremental updates of the maps, e.g., incremental update 218, to the clients. Further example details regarding incremental ALTO service map updates can be found in Raghunath et al., referenced above. In this manner, ALTO clients obtain network and cost maps from ALTO server 200 that reflect a current physical location topology for a network that includes mobile devices.

In some embodiments of ALTO server 200, client interface 230 implements an endpoint cost service. When client interface 230 receives, from client 214, a list of endpoints represented in network map 220, client interface 230 returns an ordinally ranked list of the endpoints or the costs, specified by cost map 222, between the endpoints and client 214 or between the endpoints and another specified source node.

In some embodiments, client 214 represents a P2P device participating in a P2P application. For example, client 214 may represent an ALTO client operating within mobile device 210. In such examples, client 214 receives network map 220 and cost map 222 or utilizes the endpoint cost service in the manner described above.

Figure 11:
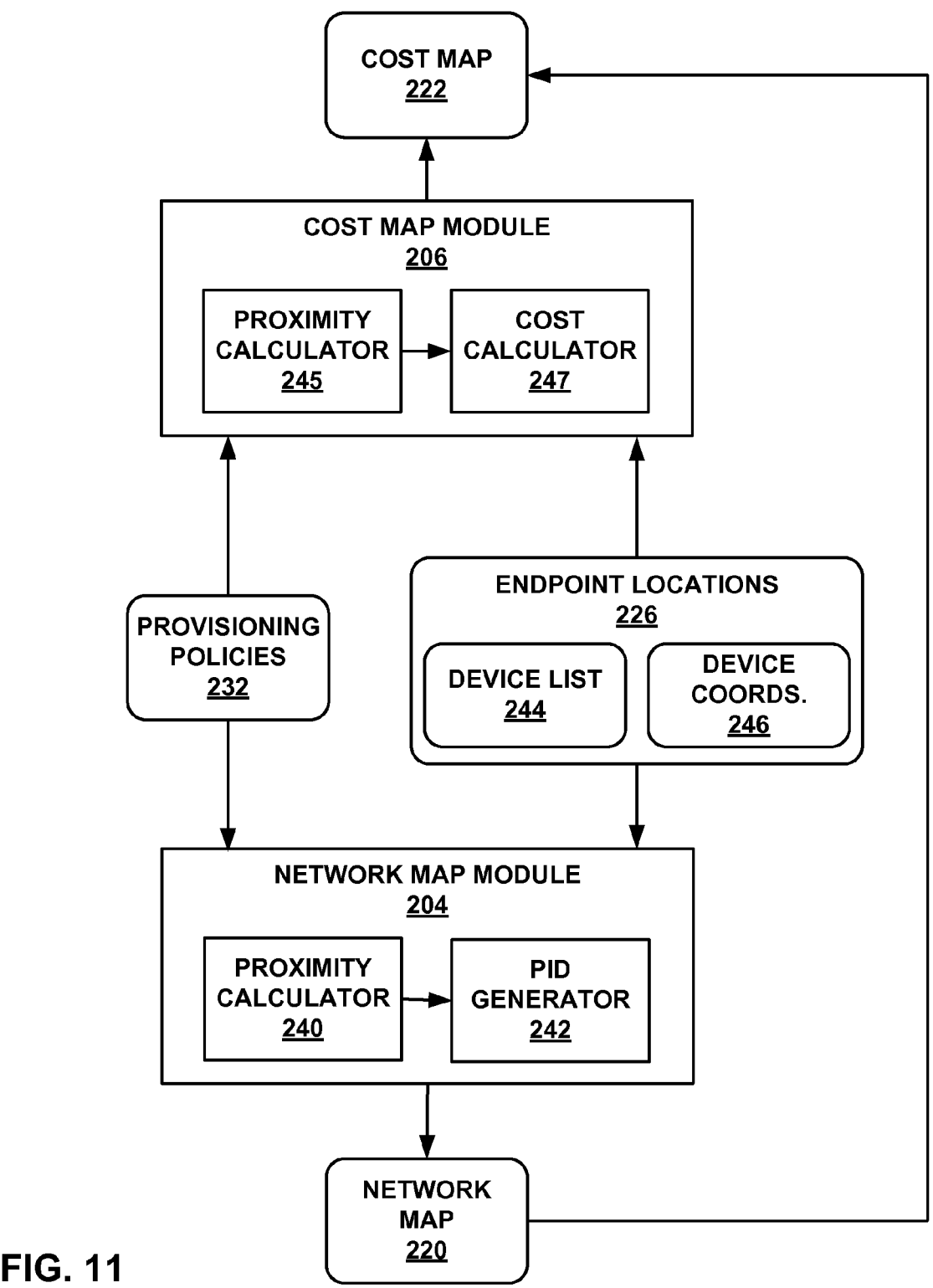
FIG. 11 is a block diagram illustrating an exemplary network map module and cost map module of ALTO server of FIG. 10 in further detail.

FIG. 11 is a block diagram illustrating exemplary components of ALTO server 200 of FIG. 10 in further detail. Network map module 204 queries endpoint locations 226 and provisioning policies 232 to generate network map 220 using the location-based techniques described herein. In the illustrated embodiment, endpoint locations 226 maps devices in device list 244 to a physical location stored in device coordinates 246 ("device coords. 246") for respective devices. Device list 244 represents a list of mobile devices each identified by network address, such as an IP address. Device list 244 may in some instances also include devices that are not generally considered "mobile," such as servers, controllers, and content delivery network caches. Device coordinates 246 comprises a list of longitude/latitude coordinates that identify locations of corresponding devices 244 on the Earth. Device list 244 and device coordinates 246 may represent different fields of a single associative data structure, such as a lookup table.

Provisioning policies 232 includes one or more policy rules to specify aggregating endpoints into PIDs based at least on a physical location distance among endpoints, in accordance with the techniques described herein. Proximity calculator 240 of network map module 204 uses device coordinates 246 to determine physical location distances between various devices in device list 244 using a longitude/latitude distance calculation and, based on these distances, generates a matrix of distances among the devices. The matrix may represent any data structure that is able to specify distances among the devices. PID generator 242, in accordance with provisioning policies 232, aggregates devices in device list 244 into PIDs using distances among the mobile devices in the matrix calculated by proximity calculator 240. PID generator 242 may in some instances generate a PID for each endpoint in the served network, including devices not generally considered mobile.

Network map module 204 constitutes the aggregated PIDs into network map 220. Network map module 204 generates ALTO network map 220 in a manner that accounts for a physical location of mobile devices in a network served by ALTO server 200. Upon receiving network map 220 from ALTO server 200, ALTO clients may thus improve performance of application by enabling selection of content servers for a content requesting mobile device based at least on a physical location of the mobile device.

Cost map module 206 queries endpoint locations 226 and provisioning policies 232 to generate cost map 222 using the location-based techniques herein described. Provisioning policies 232 may additionally include one or more policies to specify formulas, parameters, and other values that affect costs calculated based at least on a physical distance among endpoints and among PIDs that represent endpoints. Proximity calculator 245 of cost map module 206 uses device coordinates 246 to determine physical location distances between various devices in device list 244 using a longitude/latitude distance calculation and, based on these distances, generates a matrix of distances among the devices. The matrix may represent any data structure that is able to specify distances among the devices. Cost calculator 247 applies provisioning policies 232 to the calculated matrix and network map 220 to determine costs among PIDs specified in the network map and generate cost map 222 that includes cost map entries for the PID pairs.

Figure 12:
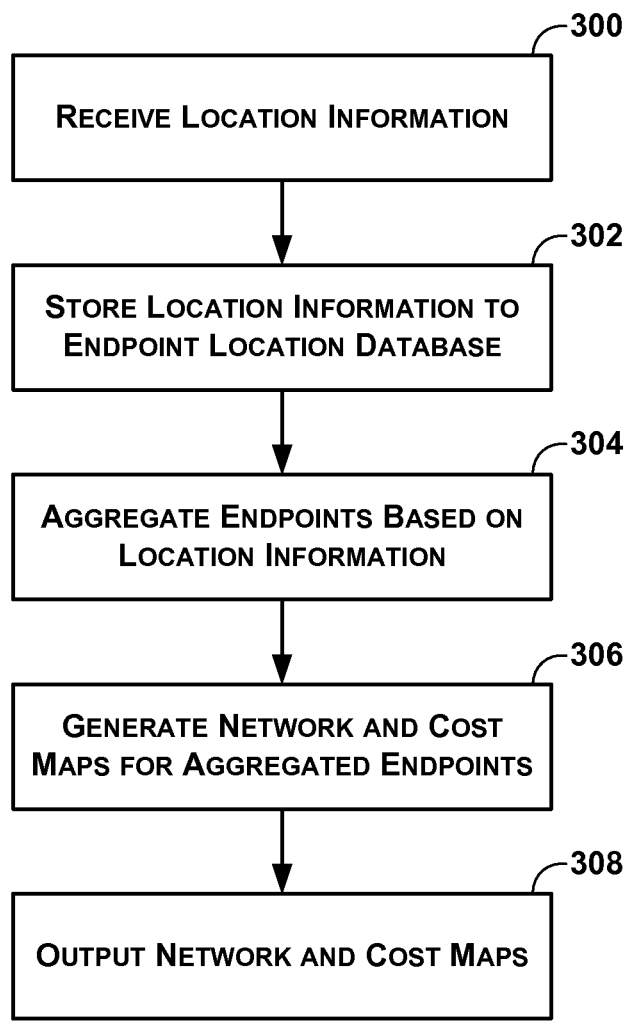
FIG. 12 is a flowchart illustrating an exemplary mode of operation of ALTO server of FIG. 10 to generate ALTO service maps in accordance with the described techniques.

FIG. 12 is a flowchart illustrating an exemplary mode of operation of ALTO server 200 of FIG. 10. Endpoint interface 208 receives location update 212 from mobile device 210 (300) and stores location information for mobile device 210 contained therein to endpoint locations 226 (302), which contains location information for one or more devices in a network served by ALTO server 200. Network map module 204 applies provisioning policies 232 to aggregate endpoints, including mobile device 210, into one or more PIDs for a network map based on physical distances among one or more of the endpoints calculated using location information in endpoint locations 226 (304). In some instances, network map module 204 modifies current PIDs for an existing network map 220 using the new location information received in location update 212.

Network map module 204 uses the aggregated PIDs to generate network map 220, and cost map module 206 specifies costs for inter-PID links, in accordance with provisioning policies 232, to generate cost map 222 (306). Client interface 230 outputs network map 220 and cost map 222, or incremental updates thereof, to client 214 (308).

The techniques described in this disclosure may be implemented, at least in part, in hardware, software, firmware or any combination thereof on the device management system and the managed devices. For example, various aspects of the described techniques may be implemented as encoded program code executed by one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium or a non-transitory computer readable medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the terms "computer-readable storage media" and "non-transitory computer readable media" refer to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
   aggregating, based at least on physical location information for one or more endpoints that is stored by an application-layer traffic optimization (ALTO) server, the endpoints into a set of multiple PIDs by associating endpoints that are proximate to each other with respective PIDs in the set of PIDs;
   generating, with the ALTO server, a first ALTO network map that includes a plurality of PID entries that each identifies a subset of the endpoints associated with a corresponding one of the set of PIDs;

23 receiving, with the ALTO server, a location update from a first endpoint of the endpoints, wherein the location update includes physical location information for the first endpoint; and modifying a first PID and a second PID in the set of PIDs to transfer an association with the first endpoint from the first PID to the second PID when the physical location information for the first endpoint specifies a nearer proximity of the first endpoint to a subset of the endpoints associated with the second PID than to a subset of the endpoints associated with the first PID.

2. The method of claim 1, further comprising:

generating a second ALTO network map, wherein the second ALTO network map accounts for the physical location information to represent an updated ALTO topology for the network;

determining a difference between the first ALTO network map and the second ALTO network map; and outputting an update message from the ALTO server to an ALTO client that comprises an incremental update of the first ALTO map to cause the ALTO client to conform a third ALTO map stored by the ALTO client to the second ALTO map.

3. The method of claim 1, wherein the physical location information for each of the endpoints specifies a geographical location, and wherein endpoints are proximate to each other when a physical distance between the endpoints is less than a threshold distance.

4. The method of claim 1, wherein the physical location information for each of the endpoints specifies an identifier of a serving node, and wherein a subset of endpoints are proximate to each other when the physical location information for each of the subset of the endpoints specifies the same serving node identifier.

5. The method of claim 1, wherein the ALTO server stores network topology information for a network that includes the endpoints, and further comprising:

aggregating the endpoints into a first set of multiple PIDs based at least on the physical location information, wherein each of the first set of PIDs is associated with a subset of the endpoints;

aggregating the endpoints into a second set of multiple PIDs based at least on the network topology information, wherein each of the second set of PIDs is associated with a subset of the endpoints; and intersecting the first set of PIDs and the second set of PIDs to generate a set of one or more intersection PIDs, wherein each of the intersection PIDs is associated with a subset of the endpoints, wherein the PID entries of the first ALTO network map includes PID entries to identify the respective subset of the endpoints associated with each of the set of intersection PIDs.

6. The method of claim 5, further comprising:

generating a first ALTO cost map for the first set of PIDs that includes one or more cost entries that each specify a different pair of the first set of PIDs and an associated value that represents a cost to traverse a path between members of a respective pair of the first set of PIDs;

generating a second ALTO cost map for the second set of PIDs that includes one or more cost entries that each specify a different pair of the second set of PIDs and an associated value that represents a cost to traverse a network path between members of a respective pair of the second set of PIDs;

generating an intersection ALTO cost map for the set of intersection PIDs by combining associated values of cost entries of the first ALTO cost map and associated values of cost entries of the second ALTO cost map to produce intersection costs entries that each specify a different pair of the intersection PIDs and an associated value that represents a total cost to traverse a path between members of a respective pair of intersection PIDs.

7. The method of claim 1, wherein the ALTO server supports a service selected from the group consisting of an hypertext transfer protocol (HTTP) service, a file transfer protocol (FTP) service, a media streaming service, domain name service (DNS), and an advertising service.

8. The method of claim 1, further comprising outputting the first ALTO network map to an ALTO client.

9. The method of claim 1, wherein one or more of the endpoints are mobile devices that are each assigned a network address, wherein a network address for a mobile device indicates a location of the mobile device in a routing topology of a network.

10. A method comprising:

aggregating, based at least on physical location information for one or more endpoints that is stored by an application-layer traffic optimization (ALTO) server, the endpoints into a set of multiple PIDs by associating endpoints that are proximate to each other with respective PIDs in the set of PIDs;

generating, with the ALTO server, a first ALTO network map that includes a plurality of PID entries that each identifies a subset of the endpoints associated with a corresponding one of the set of PIDs;

generating, with the ALTO server, an ALTO cost map comprising one or more cost map entries for the first ALTO network map, wherein each of the cost map entries specifies a cost to traverse a path between a pair of the set of multiple PIDs;

receiving, with the ALTO server, a location update from a first endpoint of the endpoints, wherein the location update includes physical location information for the first endpoint; and upon receiving the location update with the ALTO server, modifying a cost map entry of the ALTO cost map, for a PID pair that includes a first one of the set of multiple PIDs that includes the first endpoint, based at least on the physical location information for the first endpoint.

11. An application-layer traffic optimization (ALTO) server comprising:

a processor operatively coupled to a memory;

an endpoint locations module to store physical location information for one or more endpoints;

a PID generator, executed by the processor, to aggregate the endpoints into a set of multiple PIDs based at least on the physical location information by associating endpoints that are proximate to each other with respective PIDs in the set of PIDs;

a network map module to generate a first ALTO network map that includes a plurality of PID entries that each identifies a subset of the endpoints associated with a corresponding one of the set of PIDs; and an endpoint interface to receive a location update from a first endpoint of the endpoints, wherein the location update includes physical location information for the first endpoint, wherein the endpoint interface stores the physical location information for the first endpoint to the endpoint locations module, wherein the PID generator modifies a first PID and a second PID in the set of PIDs to transfer an association with the first endpoint from the first PID to the second PID when the physical location information for the first endpoint specifies a nearer proximity of the first endpoint to a subset of the endpoints associated with the second PID than to a subset of the endpoints associated with the first PID.

12. The ALTO server of claim 11, further comprising:
a proximity calculator to determine proximities among endpoints in the set of endpoints.

13. The ALTO server of claim 12,
wherein the physical location information for each of the endpoints specifies a geographical location, and
wherein the proximity calculator determines proximities among endpoints by calculating distance between pairs of endpoints using the respective geographical locations of the endpoints.

14. The ALTO server of claim 12,
wherein the physical location information for each of the endpoints specifies an identifier of a serving node, and
wherein the proximity calculator determines proximities among endpoints by determining whether the physical location information for the each of the endpoints specifies the same serving node identifier.

15. The ALTO server of claim 11, further comprising:
a network information base to store network topology information for a network that includes the endpoints,
wherein the PID generator aggregates the endpoints into a first set of multiple PIDs based at least on the physical location information, wherein each of the first set of PIDs is associated with a subset of the endpoints,
wherein the PID generator aggregates the endpoints into a second set of multiple PIDs based at least on the network topology information, wherein each of the second set of PIDs is associated with a subset of the endpoints,
wherein the PID generator aggregates intersects the first set of PIDs and the second set of PIDs to generate a set of one or more intersection PIDs, wherein each of the intersection PIDs is associated with a subset of the endpoints, and
wherein the PID entries of the first ALTO network map includes PID entries to identify the respective subset of the endpoints associated with each of the set of intersection PIDs.

16. The ALTO server of claim 15, further comprising:
a cost map module to generate a first ALTO cost map for the first set of PIDs that includes one or more cost entries that each specify a different pair of the first set of PIDs and an associated value that represents a cost to traverse a path between members of a respective pair of the first set of PIDs,
wherein the cost map module generates a second ALTO cost map for the second set of PIDs that includes one or more cost entries that each specify a different pair of the second set of PIDs and an associated value that represents a cost to traverse a network path between members of a respective pair of the second set of PIDs,
wherein the cost map module generates an intersection ALTO cost map for the set of intersection PIDs by combining associated values of cost entries of the first ALTO cost map and associated values of cost entries of the second ALTO cost map to produce intersection costs entries that each specify a different pair of the intersection PIDs and an associated value that represents a total cost to traverse a path between members of a respective pair of intersection PIDs, and further comprising:
a client module to output the first ALTO network map and the intersection ALTO cost map as ALTO service maps for an ALTO service.

17. The ALTO server of claim 11, further comprising:
a cost map module to generate an ALTO cost map comprising one or more cost map entries for the first ALTO network map;
a client interface to receive identifiers, from a network device, for a source endpoint and one or more destination endpoints, wherein the client interface determines, from the first ALTO network map and ALTO cost map, associated costs for each of the destination endpoints to the source endpoint.

18. The ALTO server of claim 17, wherein the client interface returns a ranking of the one or more destination endpoints according to the associated costs to the network device.

19. The ALTO server of claim 17, wherein the client interface returns the associated costs to the network device.

20. An application-layer traffic optimization (ALTO) server comprising:
a processor operatively coupled to a memory;
an endpoint locations module to store physical location information for one or more endpoints;
a PID generator, executed by the processor, to aggregate the endpoints into a set of multiple PIDs based at least on the physical location information by associating endpoints that are proximate to each other with respective PIDs in the set of PIDs;
a network map module to generate a first ALTO network map that includes a plurality of PID entries that each identifies a subset of the endpoints associated with a corresponding one of the set of PIDs;
a cost map module to generate an ALTO cost map comprising one or more cost map entries for the first ALTO network map, wherein each of the cost map entries specifies a cost to traverse a path between a pair of the set of multiple PIDs; and
an endpoint interface to receive a location update from a first endpoint of the endpoints, wherein the location update includes physical location information for the first endpoint, wherein the endpoint interface stores the physical location information for the first endpoint to the endpoint locations module,
wherein the cost map module, upon the endpoint interface receiving the location update, modifies a cost map entry of the cost map entries of the ALTO cost map, for a PID pair that includes a first PID that includes the first endpoint, based at least on the physical location information for first endpoint.

21. A non-transitory computer-readable medium comprising instruction for causing one or more programmable processors to:
aggregate, based at least on physical location information for one or more endpoints that is stored by an application-layer traffic optimization (ALTO) server, the endpoints into a set of multiple PIDs by associating endpoints that are proximate to each other with respective PIDs in the set of PIDs;
generate a first ALTO network map that includes a plurality of PID entries that each identifies a subset of the endpoints associated with a corresponding one of the set of PIDs;

receive, with the ALTO server, a location update from a first endpoint of the endpoints, wherein the location update includes physical location information for the first endpoint; and modify a first PID and a second PID in the set of PIDs to transfer an association with the first endpoint from the first PID to the second PID when the physical location information for the first endpoint specifies a nearer proximity of the first endpoint to a subset of the endpoints associated with the second PID than to a subset of the endpoints associated with the first PID.

\* \* \* \* \*